United States Patent
Yoshida et al.

(10) Patent No.: US 7,193,785 B2
(45) Date of Patent: Mar. 20, 2007

(54) ZOOM LENS SYSTEM AND IMAGE-TAKING APPARATUS HAVING THE SAME

(75) Inventors: Hirohumi Yoshida, Tochigi-ken (JP); Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 11/185,232

(22) Filed: Jul. 19, 2005

(65) Prior Publication Data

US 2006/0023316 A1 Feb. 2, 2006

(30) Foreign Application Priority Data

Jul. 30, 2004 (JP) ............... 2004-224770

(51) Int. Cl.
*G02B 15/14* (2006.01)
(52) U.S. Cl. ...................... 359/676; 359/683
(58) Field of Classification Search ................ 359/676, 359/683, 708, 720
See application file for complete search history.

(56) References Cited

U.S. PATENT DOCUMENTS

| | | | |
|---|---|---|---|
| 3,305,294 A | 2/1967 | Alvarez | 351/169 |
| 3,583,790 A | 6/1971 | Baker | 350/184 |
| 4,925,281 A | 5/1990 | Baker | 350/423 |
| 5,644,374 A * | 7/1997 | Mukaiyama et al. | 351/169 |
| 6,850,372 B1 * | 2/2005 | Stenton | 359/676 |
| 7,149,037 B2 * | 12/2006 | Yoshida et al. | 359/676 |

FOREIGN PATENT DOCUMENTS

JP 64-35964 2/1989

OTHER PUBLICATIONS

Keisuke Araki, *Paraxial Analysis for Off-Axial Optical Systems*, Optics Technology Research Laboratories, Canon Inc., 3-30-2, Shimomaruko, Ohta-ku, Tokyo 146-8501.

* cited by examiner

*Primary Examiner*—David N. Spector
(74) *Attorney, Agent, or Firm*—Morgan & Finnegan LLP

(57) ABSTRACT

A zoom lens system includes plural optical units each of which includes plural optical elements each having a rotationally asymmetrical surface, and changes optical power as the optical elements in each of the plural optical units move in directions different from an optical axis, wherein the plural optical units have first and second units, and when the optical power of the first unit changes from positive to negative, the second unit changes from negative to positive, wherein a variation range of the optical power of an entire system includes a point where the first and second units have the same optical power, and wherein the point shifts to a side where optical power is greater than a center of the variation range of the optical power of the entire system.

14 Claims, 21 Drawing Sheets

TELEPHOTO END

WIDE-ANGLE END

MIDDLE

BACK FOCUS OF SURFACE Si

ZOOM LENS SYSTEM AND IMAGE-TAKING APPARATUS HAVING THE SAME

BACKGROUND OF THE INVENTION

The present invention relates generally to a zoom lens system, such as an image-taking apparatus, a projection apparatus, an exposure apparatus, and a reader apparatus. The present invention is particularly suitable for a small image-taking apparatus.

Along with the recent widespread of digital cameras and camera phones, an application field of small camera is increasingly spreading. For smaller sizes of such cameras, a smaller image-pickup device is increasingly demanded. In addition, the added values are also increasingly demanded, such as zooming, wide-angle arrangement, and high-definition performances. However, it is difficult to combine the miniaturization with the highly added values in view of the zooming scheme, because zooming usually needs movements of a lens along an optical path relative to a light-receiving surface, such as a CCD, and movements in the object direction extends an overall length of the optical system, preventing the miniaturization.

Prior art include U.S. Pat. Nos. 3,305,294 and 3,583,790, and Japanese Patent Application, Publication No. 01-35964. U.S. Pat. No. 3,305,294 provides each of a pair of lenses with a curved surface expressed by a cubic function, and shifts these two lenses in a direction different from the optical-axis direction for power variations and miniaturization. This lens is referred to as a so-called Alvarez lens. The Alvarez lens does not move in the optical-axis direction, and contributes to a reduction of the overall length. U.S. Pat. No. 3,583,790 proposes a removal of an aberration by providing a curved surface with high-order term, in particular, a quitic term. Japanese Patent Application, Publication No. 01-35964 propose that at least two lenses be arranged to change the power while the image point is maintained.

When a rotationally asymmetrical lens is included, no common axis is provided unlike a normal coaxial lens. Such a non-coaxial optical system is referred to as an off-axial optical system. Where a reference axis is defined as an optical path of the light that passes the center of an image and the center of the pupil, this optical system is defined as an optical system that includes an off-axial curved surface in which a surface normal at an intersection between the reference axis and a forming surface is not located on the reference axis. The reference axis has a bent shape, and thus a calculation of the paraxial amount should use the paraxial theory that relies upon the off-axial theory instead of the paraxial theory for a coaxial system. Optics Vol. 29, No. 3 (2000) implements this method by calculating a 4×4 matrix based on the curvature of the surface.

In designing a zoom lens system, U.S. Pat. Nos. 3,305,294 and 3,583,790 simply mention a method of using of a pair of rotationally asymmetrical lenses to change the power and to correct the aberration, and cannot maintain the image plane constant problematically. On the other hand, Japanese Patent Application, Publication No. 01-35964 discloses a principle to change the power while maintaining the image point constant, but does not actually design a zoom lens system through aberration corrections. An attempt was made to actually design a zoom lens system in accordance with Japanese Patent Application, Publication No. 01-35964. Prior to a discussion of the designed example, a description will be given of the way of expression of a specification in the embodiments and common matters to each embodiment.

The off-axial optical system has a bent reference axis as shown in FIG. 2. In an absolute coordinate system with an origin that is set at a center of a first surface, a reference axis is defined as a path which a ray that passes the origin and the pupil center traces. A Z-axis is defined as a line that connects the center of the image center to the origin of the absolute coordinate system as the center of the first surface, where a direction from the first surface to the center of the image is set positive. The Z-axis is referred to as an optical axis. A Y-axis is defined as a line that passes the origin and forms 90° with respect to the Z-axis in accordance with a rule of a right-hand coordinate system, and an X-axis is defined as a line that passes the origin and is orthogonal to the Y-axis and Z-axis. In this application, a paraxial value is a result of the off-axial paraxial tracing. Unless otherwise specified, it is a result of the off-axial paraxial tracing and a calculation of the paraxial value. In addition, an optical system has two or more rotationally asymmetrical, aspherical surfaces each having the following shape:

$$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6$$ [EQUATION 1]

Equation 1 includes only even-order terms with respect to "x," and the curved surface defined by Equation 1 is symmetrical with respect to the yz plane.

When the following condition is met, Equation 1 is symmetrical with respect to the xz plane:

$$C03 = C21 = C05 = C23 = C41 = t = 0$$ [EQUATION 2]

When the following conditions are met, Equation 1 is a rotationally symmetrical shape:

$$C02 = C20$$ [EQUATION 3]

$$C04 = C40 = C22/2$$ [EQUATION 4]

$$C06 = C60 = C24/3 = C42/3$$ [EQUATION 5]

When the above conditions are not met, Equation 1 provides a rotationally asymmetrical shape.

A description will now be given of one actual design example of a zoom lens system in accordance with Japanese Patent Application, Publication No. 01-35964. The zoom lens system includes two pairs of rotationally asymmetrical lens units, which are labeled first and second units in order from an object side. First, these units are approximated by one thin lens for paraxial calculation purposes. The following equation is met, where $\phi 1$ and $\phi 2$ are the powers of these thin lenses of the first and second units, "e" is a principal point separation, "Sk" is a back-focus, $\phi$ is the power of the entire system, and "f" is a focal length:

$$\phi = \frac{1}{f} = \phi_1 + \phi_2 - e\phi_1\phi_2$$ [EQUATION 6]

The back-focus Sk satisfies the following equation from the paraxial calculation:

$$S_k = \frac{1 - e\phi_1}{\phi}$$ [EQUATION 7]

When the principal point separation e and back-focus Sk are determined, $\phi 1$ and $\phi 2$ are expressed as a function of the power $\phi$ of the entire system from Equations 6 and 7 or paths of power changes of the first and second units in the changes of the power of the entire system. When the principal point separation e=3 and the back-focus Sk=15, φ1 and φ2 become as follows:

$$\phi_1 = -5\varphi + \frac{1}{3}$$ [EQUATION 8]

$$\phi_2 = \frac{1}{45\varphi} - \frac{2}{5}$$ [EQUATION 9]

FIG. 3 is a graph indicative of a relationship between φ1 and φ2 and the power φ of the entire system. As the power of the entire system increases, the first unit changes from positive to negative whereas the second conversely changes from negative to positive. Here, the rotationally asymmetrical curved surface is expressed by Equation 10, and a relationship between a coefficient "a" and the power is expressed by Equation 11:

$$z = ay^3 + 3ax^2y$$ [EQUATION 10]

$$\phi = 12a\delta(n-1)$$ [EQUATION 11]

x, y and z denote above axes. δ is an offset amount in the Y-axis direction from the Z-axis of the two rotationally asymmetrical lenses, and n is a refractive index of the lens. Table 1 indicates coefficient "a" and "n" of the rotationally asymmetrical lens, and the offset amounts δ from the Z-axis at a telephoto end, a midpoint, and a wide-angle end. Table 2 indicates a type of each surface and a surface separation.

TABLE 1 a: 4.0000E−03 n: 1.51742
OFFSET AMOUNT δ

|  | E1 | E2 | E3 | E4 |
|---|---|---|---|---|
| TELEPHOTO END | 3.00 mm | −3.00 mm | −1.18 mm | 1.18 mm |
| MIDDLE | 0.29 mm | −0.29 mm | 2.18 mm | −2.18 mm |
| WIDE-ANGLE END | −1.65 mm | 1.65 mm | 3.89 mm | −3.89 mm |

TABLE 2

| | TYPE OF SURFACE | SURFACE SEPARATION |
|---|---|---|
| OBJECT SURFACE | | INFINITY |
| S0 REFERENCE SURFACE | | 0 |
| S1 | PLANE | 1 |
| S2 | POLYNOMIAL SURFACE | 0.5 |
| S3 | POLYNOMIAL SURFACE | 1 |
| S4 | PLANE | 0.4 |
| S5 STOP SURFACE | | 0.4 |
| S6 | PLANE | 1 |
| S7 | POLYNOMIAL SURFACE | 0.5 |
| S8 | POLYNOMIAL SURFACE | 1 |
| S9 | PLANE | |

A zoom lens is designed based on these values. FIG. 4 shows it. A ray incident upon a reference surface S0 enters a unit G1 first. The unit G1 includes two lenses E1 and E2, and surface numbers are labeled S1 to S4. The lenses E1 and E2 decenter in the Y-axis direction, and their decentering amounts continuously change. These amounts have the same absolute value and a positive and negative relationship. This configuration changes the power of G1 as shown in FIG. 2 from positive to negative. The light that exits from G1 passes a stop S5 and enters G2. Like G1, G2 includes two lenses E3 and E4, and surface numbers are labeled S6 to S9. The lenses E3 and E4 decenter in the Y-axis direction, and their decentering amounts continuously change. These amounts have the same absolute value and a positive and negative relationship. This configuration changes the power of G2 as shown in FIG. 2 from negative to positive.

The light that passes these lenses images without changing the image plane. However, it is understood from the image plane that large aberration occurs although an image is formed. The aberration occurs irrespective of the paraxial arrangements defined in Equation 10 and 11. For example, the paraxial arrangement cannot eliminate the coma that occurs on the optical axis. From the above result, the prior art cannot correct the aberration, because 1) an optical system having a rotationally asymmetrical lens is asymmetrical with respect to the optical axis, generates an offset between upper and lower rays, and consequently causes the coma for the on-axial light; and 2) the curvature of field occurs.

BRIEF SUMMARY OF THE INVENTION

The present invention is to provide a zoom lens system that moves a lens in a direction different from the optical axis for zooming and sufficiently eliminates the aberration, and an image-taking apparatus having the same.

A zoom lens system according to one aspect of the present invention includes plural optical units each of which includes plural optical elements each having a rotationally asymmetrical surface, and changes optical power as the optical elements in each of the plural optical units move in directions different from an optical axis, wherein the plural optical units have first and second units, and when the optical power of the first unit changes from positive to negative, the second unit changes from negative to positive, wherein a variation range of the optical power of an entire system includes a point where the first and second units have the same optical power, and wherein the point shifts to a side where optical power is greater than a center of the variation range of the optical power of the entire system.

Other objects and further features of the present invention will become readily apparent from the following description of the embodiments with reference to accompanying drawings.

DETAILED DESCRIPTION OF THE PREFERRED EMBODIMENTS

First Embodiment

A description will be given of the specification according to the embodiment of the present invention. A image-taking surface assumes a CCD with a size of ¼ inch, i.e., longitudinally 2.7 mm×laterally 3.6 mm. The F-number is 4 at the wide-angle end and 6 at the telephoto end.

Figure 5:
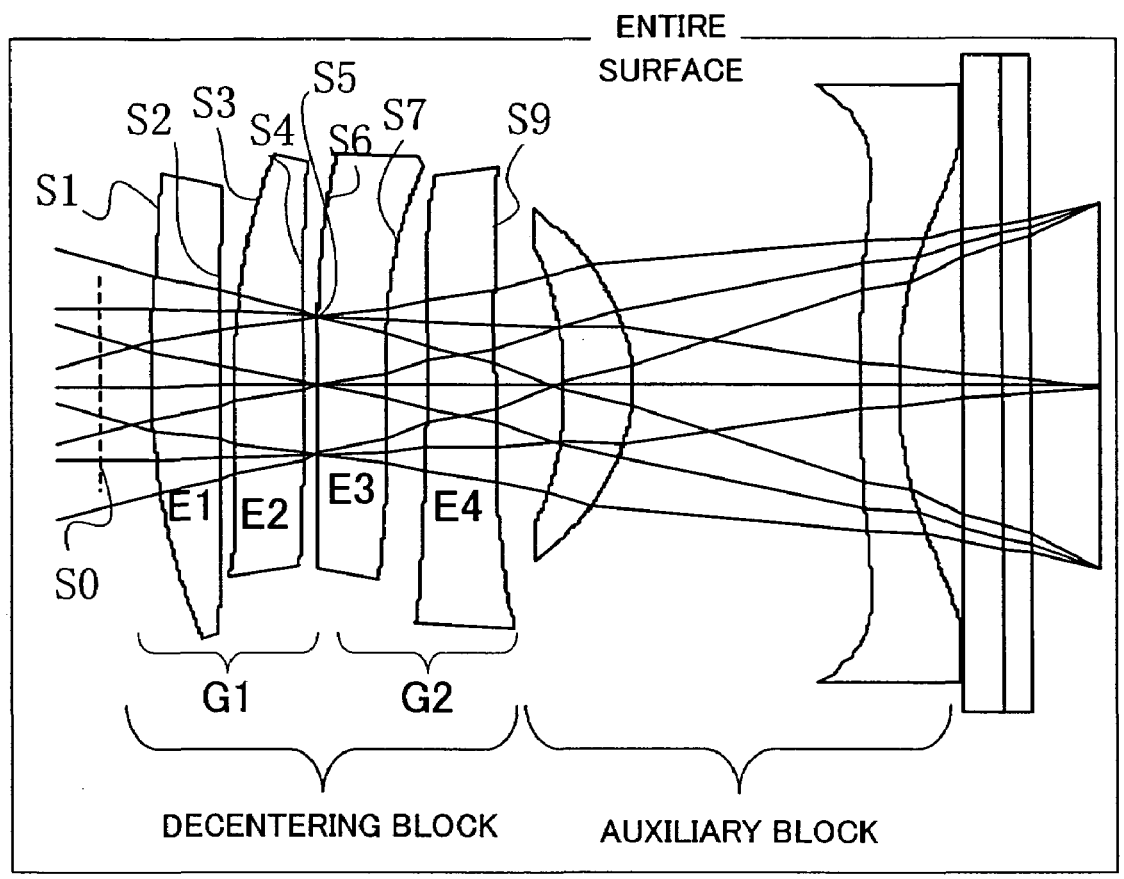
FIG. 5 is a sectional view of the lenses according to the embodiment shown in FIG. 1.

FIG. 5 shows an optical-path diagram of the first embodiment. Totally 6 lenses are included, and E1, E2, E3 and E4 from the object side (or the front) are rotationally asymmetrical lenses. These lenses decenter in the Y-axis direction and their decentering amounts continuously change. These amounts have the same absolute value and a positive and negative relationship. E5 and E6 are rotationally symmetrical, aspheric lenses, but may be rotationally asymmetrical lenses so as to eliminate any remaining aberrations that are asymmetrical with respect to the optical axis.

The lenses E1 and E2 constitute a first unit, which is labeled G1. Similarly, the lenses E3 and E4 constitute a second unit, which is labeled G2. A reference surface S0 is set as the origin of the absolute coordinate system for the surface number, and a first surface of E1 is labeled S1. S2, S3, and S4 are labeled sequentially, and the stop after S4 (or E2) is referred to as S5. A first surface of E3 is labeled S6, the following surfaces are sequentially numbered, and the image plane is labeled S17. In addition, the rotational asymmetrical lenses E1 to E4 that continuously decenter in the Y-axis direction are referred to as a decentering movable block, and the rotationally symmetrical lenses E5 and E6 are referred to as an auxiliary block. The auxiliary block helps the aberration correction, which would be otherwise difficult only with the decentering movable block. The rotationally asymmetrical lens has a rotationally asymmetrical surface on its both surfaces. Flat glasses located just before the CCD surface are an infrared cutting filter and a CCD's cover glass.

Table 3 shows lens data. Table 4 shows an offset amount from the Z-axis from each lens. Table 5 shows a coefficient of the rotationally symmetrical aspherical surface expressed by Equation 12. Table 6 shows a value of each coefficient on the polynomial surface expressed by Equation 1. Here, $h^2=X^2+Y^2$ is met in Equation 12 where c is a radius of curvature, A and B are coefficients.

$$Z = \frac{ch^2}{1+\sqrt{1-c^2h^2}} + Ah^4 + Bh^6 \qquad \text{[EQUATION 12]}$$

TABLE 3

| TYPE OF SURFACE | SURFACE SEPARATION | MATERIAL |
|---|---|---|
| OBJECT SURFACE | INFINITY | |
| S0 REFERENCE SURFACE | 0 | |
| s1 POLYNOMIAL SURFACE | 0.5 | S-BAL41 |
| s2 POLYNOMIAL SURFACE | 0.1 | |
| s3 POLYNOMIAL SURFACE | 0.1 | S-LAM59 |
| s4 POLYNOMIAL SURFACE | 0 | |
| s5 STOP SURFACE | 0 | |
| s6 POLYNOMIAL SURFACE | 0.5 | S-LAM60 |
| s7 POLYNOMIAL SURFACE | 0.3 | |
| s8 POLYNOMIAL SURFACE | 0.5 | S-LAM59 |
| s9 POLYNOMIAL SURFACE | 0.2 | |
| s10 ROTATIONALLY SYMMETRICAL ASPHERICAL SURFACE | 0.5 | S-FSL5 |
| s11 ROTATIONALLY SYMMETRICAL ASPHERICAL SURFACE | 1.758954358 | |
| s12 ROTATIONALLY SYMMETRICAL ASPHERICAL SURFACE | 0.5 | S-FSL5 |
| s13 ROTATIONALLY SYMMETRICAL ASPHERICAL SURFACE | 0.460489246 | |
| s14 PLANE | 0.3 | |
| s15 PLANE | 0.2 | |
| s16 PLANE | 0.5 | |
| IMAGE SURFACE | 0 | |

TABLE 4

| LENS NUMBER | OFFSET AMOUNT | | |
|---|---|---|---|
| | TELEPHOTO END | MIDDLE | WIDE-ANGLE END |
| E1 | 1.07833 | 0.08916 | −0.58315 |
| E2 | −1.07833 | −0.08916 | 0.58315 |
| E3 | −1.34358 | −0.27756 | 0.44509 |
| E4 | 1.34358 | 0.27756 | −0.44509 |

TABLE 5

| s10 | RADIUS OF CURVATURE | −3 |
|---|---|---|
| | A | −7.75E−03 |
| | B | −2.03E−02 |
| s11 | RADIUS OF CURVATURE | −1.3829 |
| | A | 4.30E−02 |
| | B | 2.95E−03 |

TABLE 5-continued

| s12 | RADIUS OF CURVATURE | 84.06001 |
|---|---|---|
| | A | 3.39E−02 |
| | B | −9.96E−03 |
| s13 | RADIUS OF CURVATURE | 2.967489 |
| | A | 3.20E−03 |
| | B | −5.34E−03 |

TABLE 6

| | | | | | |
|---|---|---|---|---|---|
| 2 | C02 | 6.59E−02 | C03 | −1.60E−02 | C04 | −1.57E−03 |
| | C05 | −4.27E−04 | C06 | −3.77E−05 | C20 | 5.14E−02 |
| | C21 | −8.18E−02 | C22 | 1.78E−02 | C23 | 1.55E−02 |
| | C24 | 4.32E−03 | C40 | −1.91E−02 | C41 | 3.84E−03 |
| | C42 | 7.77E−03 | C60 | 1.04E−02 | | |
| 3 | C02 | 5.05E−03 | C03 | 3.31E−03 | C04 | 6.12E−04 |
| | C05 | 1.06E−03 | C06 | 2.40E−04 | C20 | −2.08E−02 |
| | C21 | −4.27E−02 | C22 | 3.99E−02 | C23 | 3.32E−02 |
| | C24 | 5.75E−03 | C40 | 1.88E−03 | C41 | 1.09E−02 |
| | C42 | 8.73E−03 | C60 | 3.84E−02 | | |
| 4 | C02 | 4.31E−02 | C03 | 3.60E−02 | C04 | −6.11E−03 |
| | C05 | 6.82E−04 | C06 | 1.94E−02 | C20 | −9.43E−03 |
| | C21 | 9.28E−02 | C22 | −2.57E−02 | C23 | −2.41E−03 |
| | C24 | 1.29E−02 | C40 | 4.80E−02 | C41 | −4.08E−02 |
| | C42 | 1.85E−02 | C60 | 5.50E−03 | | |
| 5 | C02 | −6.28E−03 | C03 | 1.46E−02 | C04 | 2.76E−04 |
| | C05 | −1.37E−03 | C06 | 2.17E−04 | C20 | −3.35E−02 |
| | C21 | 1.20E−02 | C22 | 1.33E−02 | C23 | −8.82E−03 |
| | C24 | 6.36E−03 | C40 | 3.50E−02 | C41 | −1.41E−01 |
| | C42 | 3.92E−02 | C60 | −3.15E−02 | | |
| 7 | C02 | 6.05E−03 | C03 | 8.00E−03 | C04 | 5.33E−03 |
| | C05 | 5.07E−04 | C06 | −6.67E−04 | C20 | 2.25E−02 |
| | C21 | 9.89E−03 | C22 | 3.56E−02 | C23 | 1.57E−02 |
| | C24 | −1.90E−02 | C40 | −5.32E−02 | C41 | −6.30E−02 |
| | C42 | 1.02E−03 | C60 | −1.31E−02 | | |
| 8 | C02 | 2.32E−03 | C03 | 3.60E−02 | C04 | 1.03E−03 |
| | C05 | 1.66E−03 | C06 | −4.20E−04 | C20 | −4.55E−02 |
| | C21 | 1.06E−01 | C22 | 1.81E−02 | C23 | 1.54E−02 |
| | C24 | −1.43E−02 | C40 | −1.00E−01 | C41 | 1.96E−02 |
| | C42 | −1.07E−02 | C60 | 3.53E−02 | | |
| 9 | C02 | 2.88E−03 | C03 | 2.11E−02 | C04 | 7.24E−03 |
| | C05 | 4.43E−04 | C06 | −2.59E−04 | C20 | −4.52E−02 |
| | C21 | 1.26E−02 | C22 | 5.97E−02 | C23 | 3.14E−02 |
| | C24 | −1.75E−03 | C40 | −3.65E−02 | C41 | 1.25E−03 |
| | C42 | −4.47E−03 | C60 | 3.60E−02 | | |
| 10 | C02 | 2.42E−03 | C03 | −1.39E−03 | C04 | 6.88E−03 |
| | C05 | 5.88E−04 | C06 | 5.69E−05 | C20 | 8.48E−03 |
| | C21 | −3.70E−02 | C22 | 4.42E−02 | C23 | 2.52E−02 |
| | C24 | 1.58E−03 | C40 | 5.72E−03 | C41 | 3.37E−04 |
| | C42 | −2.97E−03 | C60 | 8.63E−03 | | |

Figure 6:
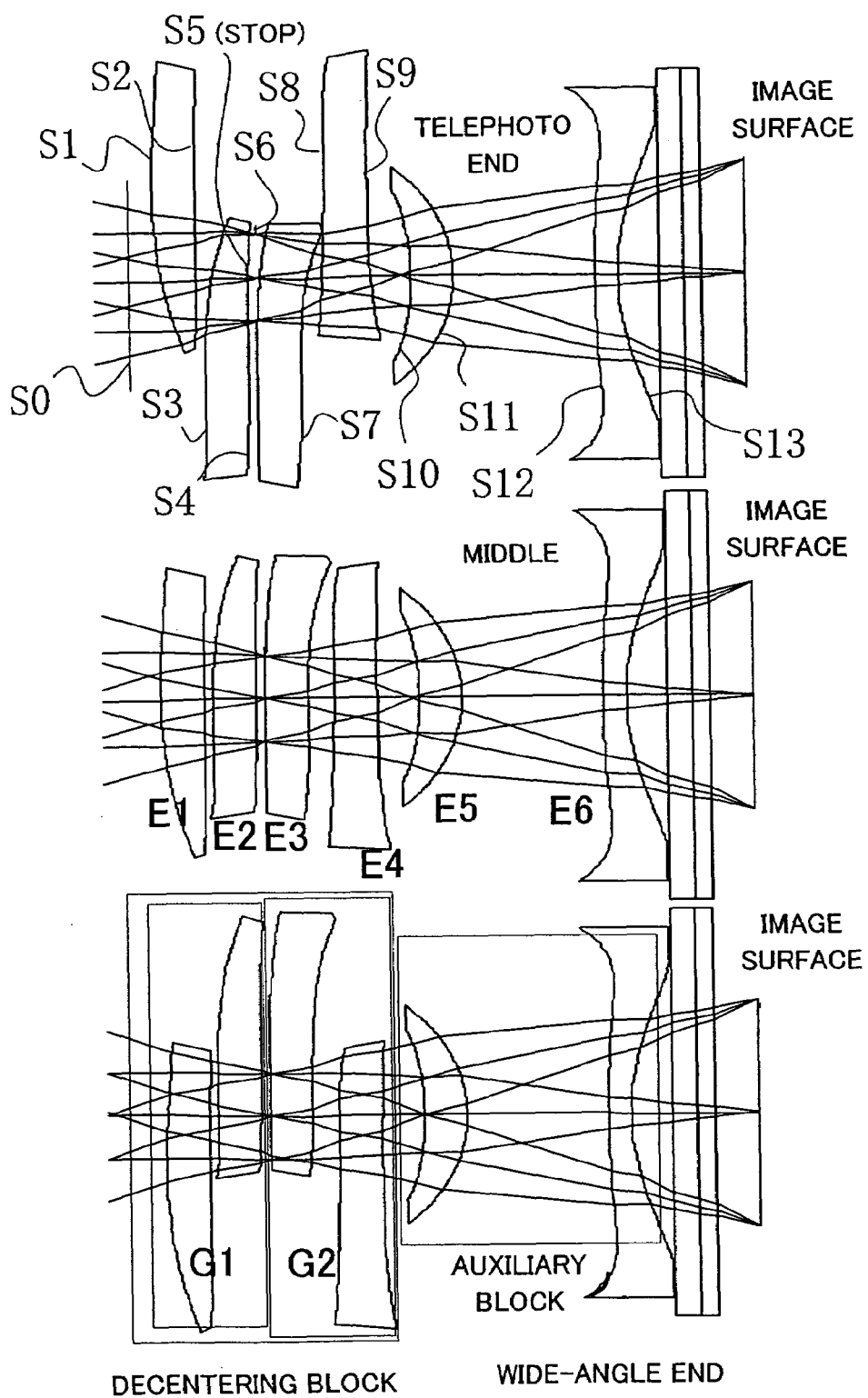
FIG. 6 shows sections of the lenses at a telephoto end, a midpoint and a wide-angle end according to the embodiment shown in FIG. 1.

FIG. 6 shows an optical-path diagram in order of the telephoto end (where the optical power of the entire system becomes minimum), the midpoint, and wide-angle end (where the optical power of the entire system becomes maximum). The light incident upon the reference surface S0 first enters the unit G1. The unit G1 includes two lenses E1 and E2, having surface numbers S1 to S4. The lenses E1 and E2 decenter in the Y-axis direction, and their decentering amounts have the same absolute value and a negative and positive relationship. This configuration changes the power of G1 from positive to negative. The light that exits from G1 passes the stop S5, and enters G2. Like G1, G2 includes two lenses E3 and E4, having surface numbers S6 to S9. The lenses E3 and E4 decenter in the Y-axis direction, and their decentering amounts have the same absolute value and a negative and positive relationship. This configuration changes the power of G2 from negative to positive. The light that passes the decentering movable block enters the next auxiliary block. The auxiliary block supplements the insufficient power of the decentering movable block. The auxiliary block includes the lenses E5 and E6, having rotationally symmetrical aspherical surfaces S10 to S13. The ray that passes these lenses passes the infrared cutting filter and the CCD's cover glass, and images without changing the image plane.

Figure 7A:
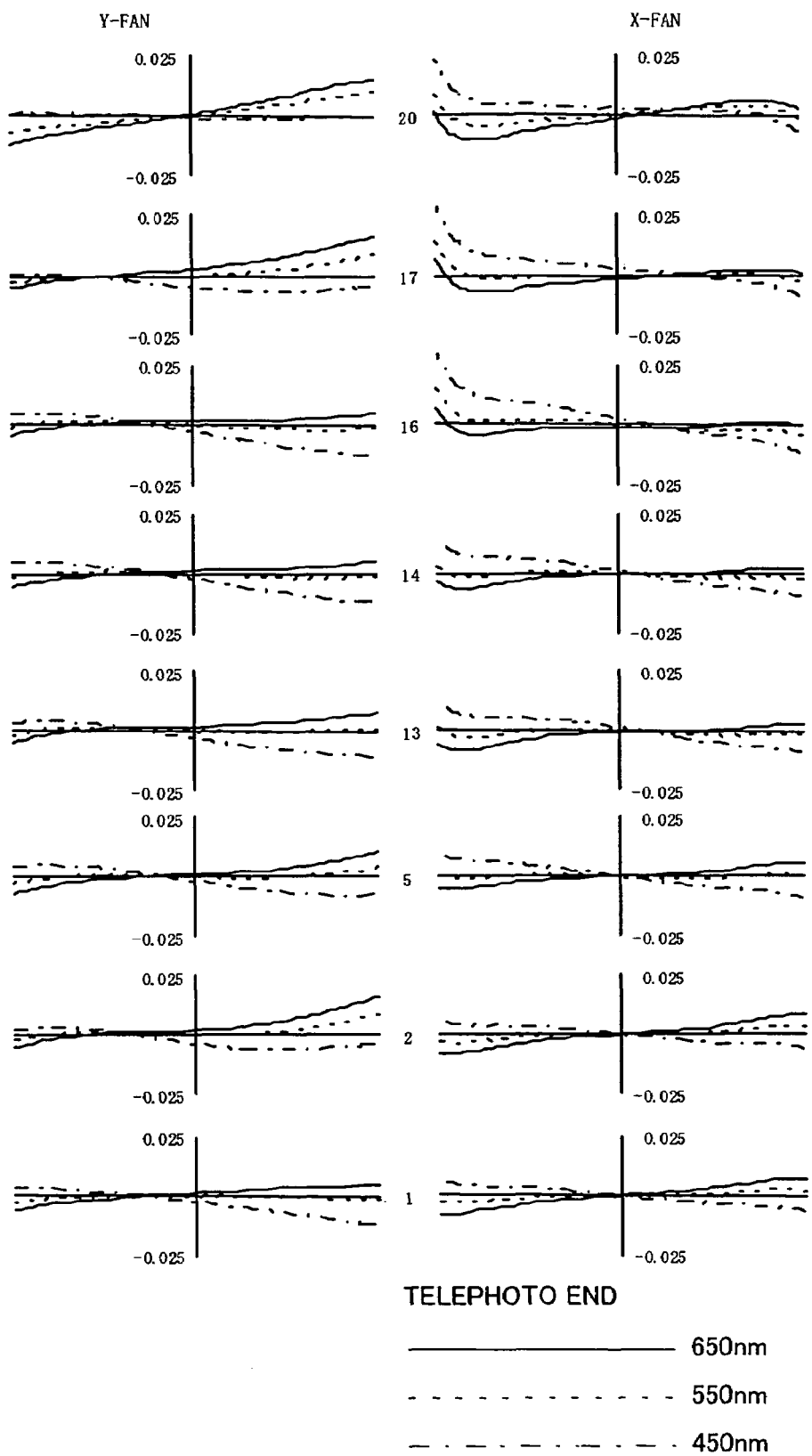
FIGS. 7A–7C are aberrational views according to the embodiment shown in FIG. 1.
Figure 7B:
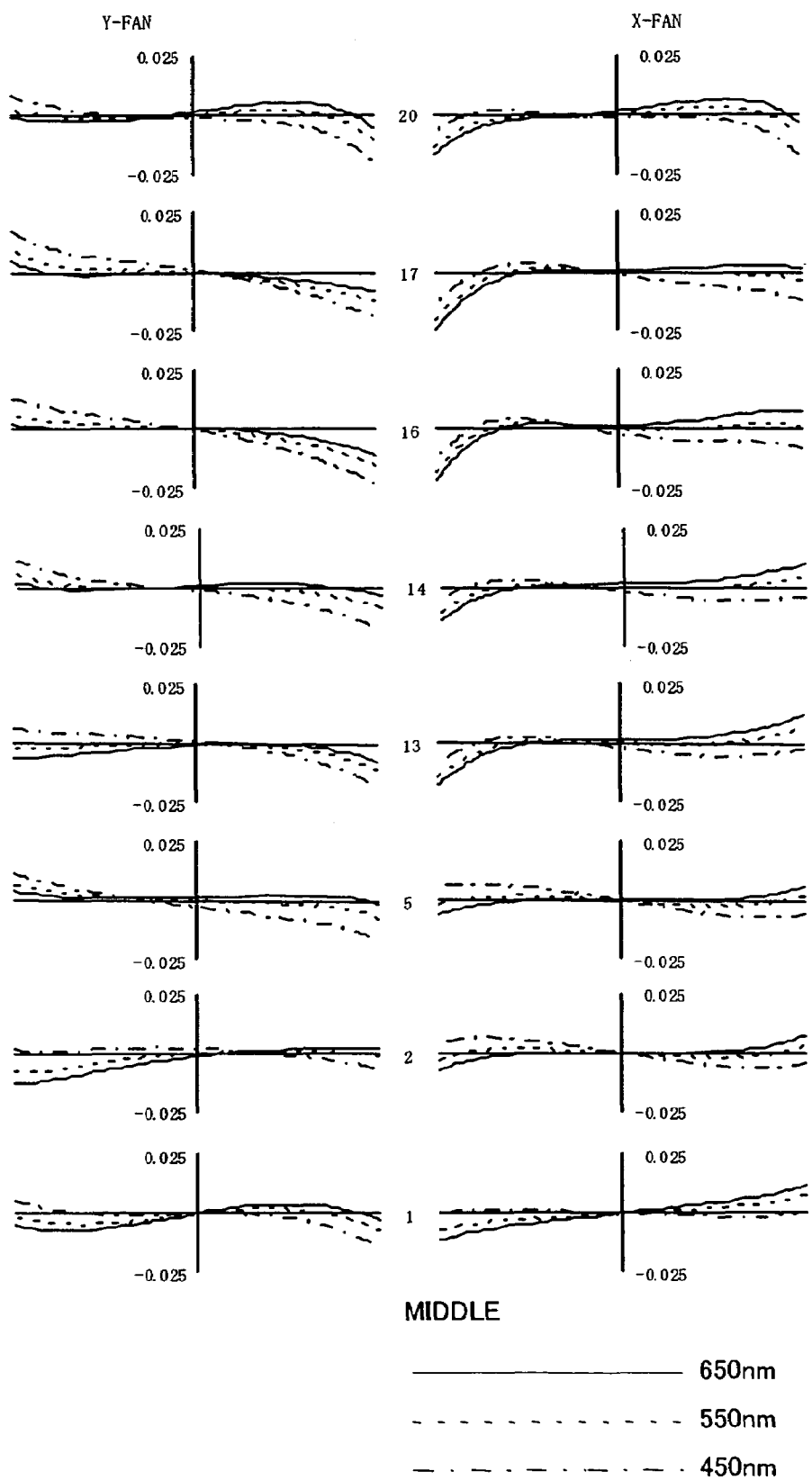
Figure 7C:
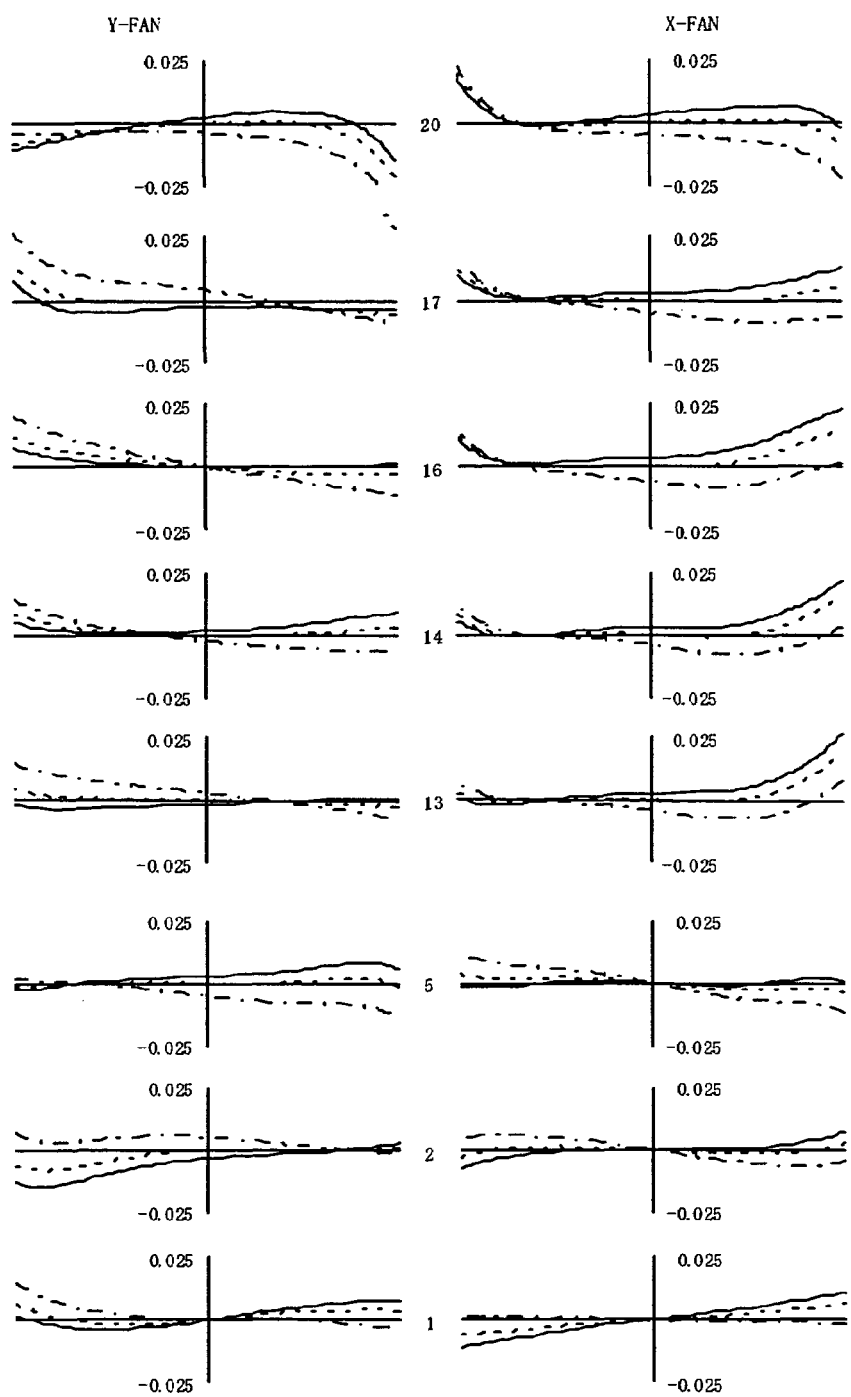
Figure 8:
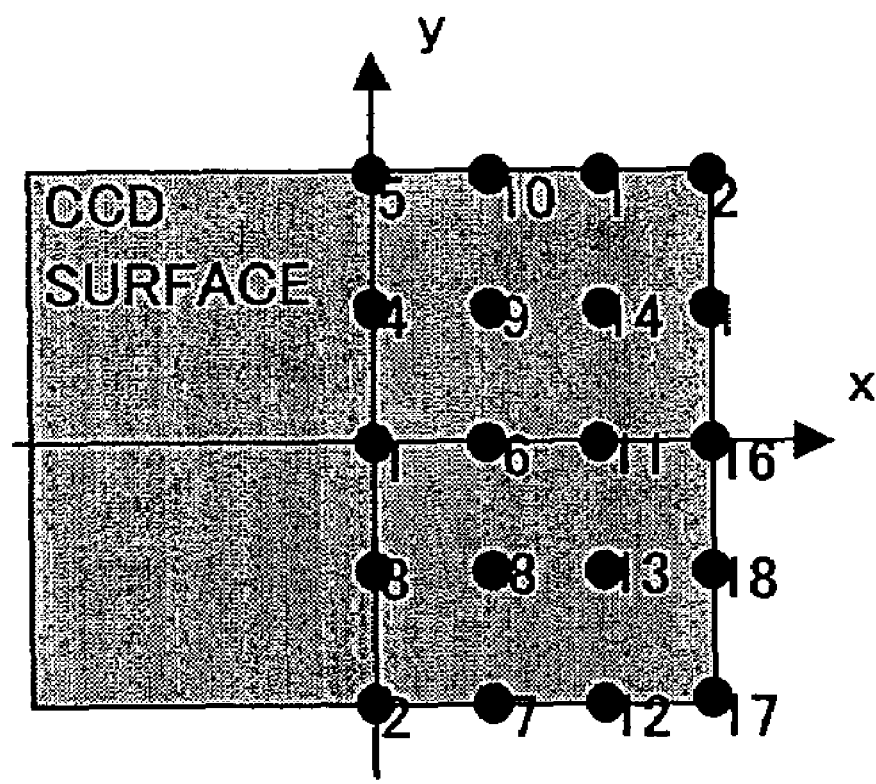
FIG. 8 is a view showing numbered rays on the image plane according to the embodiment shown in FIG. 1.
Figure 9:
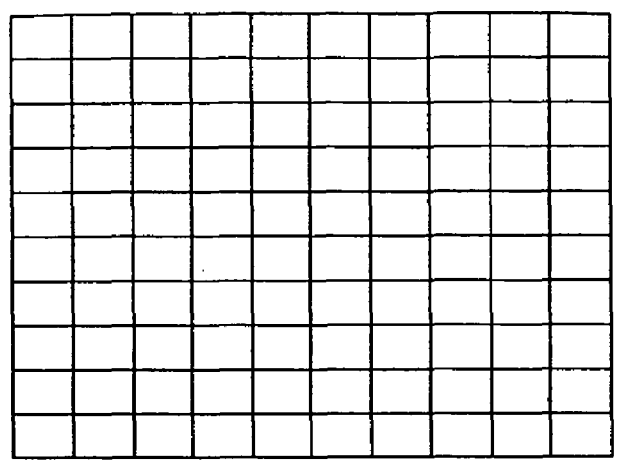
FIG. 9 shows distortion grids at a telephoto end, a midpoint and a wide-angle end.
Figure 9:
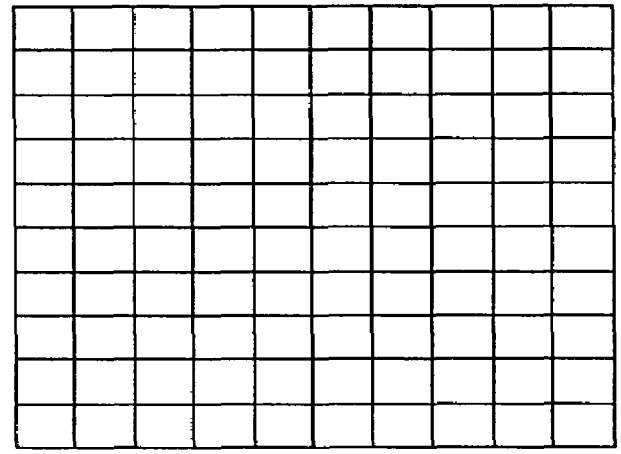
Figure 9:
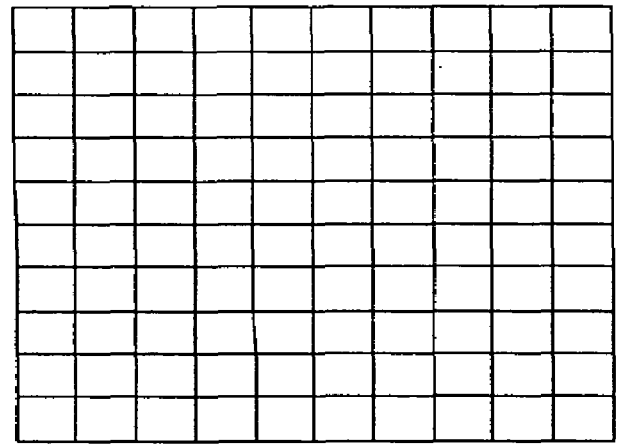

FIGS. 7A, 7B and 7C show aberrational diagrams at the telephoto end, the midpoint, and the wide-angle end, where the abscissa axis denotes an on-axial position of the light on the pupil, and the ordinate axis denotes an offset of the image plane from the principal ray. The ordinate axis ranges between ±20 μm. The number in FIGS. 7A, 7B and 7C denote an angle-of-field number, and is as shown in FIG. 8 on the image plane. Since it is symmetrical on the X-axis, only the positive in the X direction will be considered. It is understood that a ray at the angle of view of 0° sufficiently eliminates the coma from the telephoto end to the wide-angle end. In addition, FIG. 9 shows distortion grids each having a ¼ inch (longitudinally 2.7 mm×laterally 3.6 mm). It is understood from FIG. 9 that the distortion sufficiently reduces.

Figure 3:
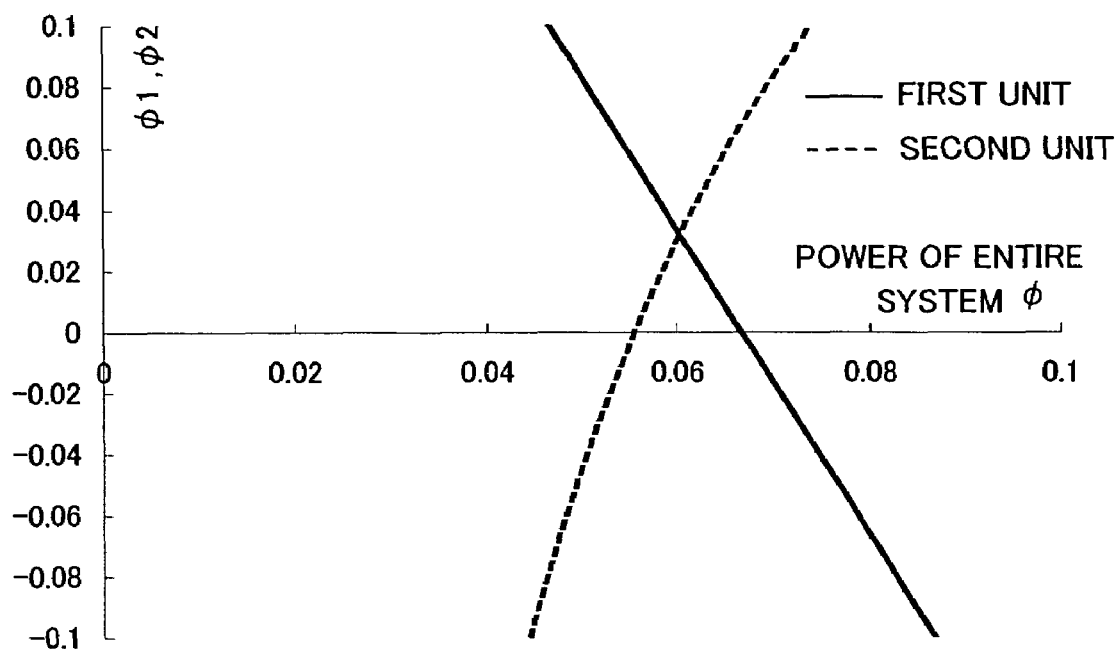
FIG. 3 is a view showing a power arrangement of lenses designed based on a prior art example.
Figure 4:
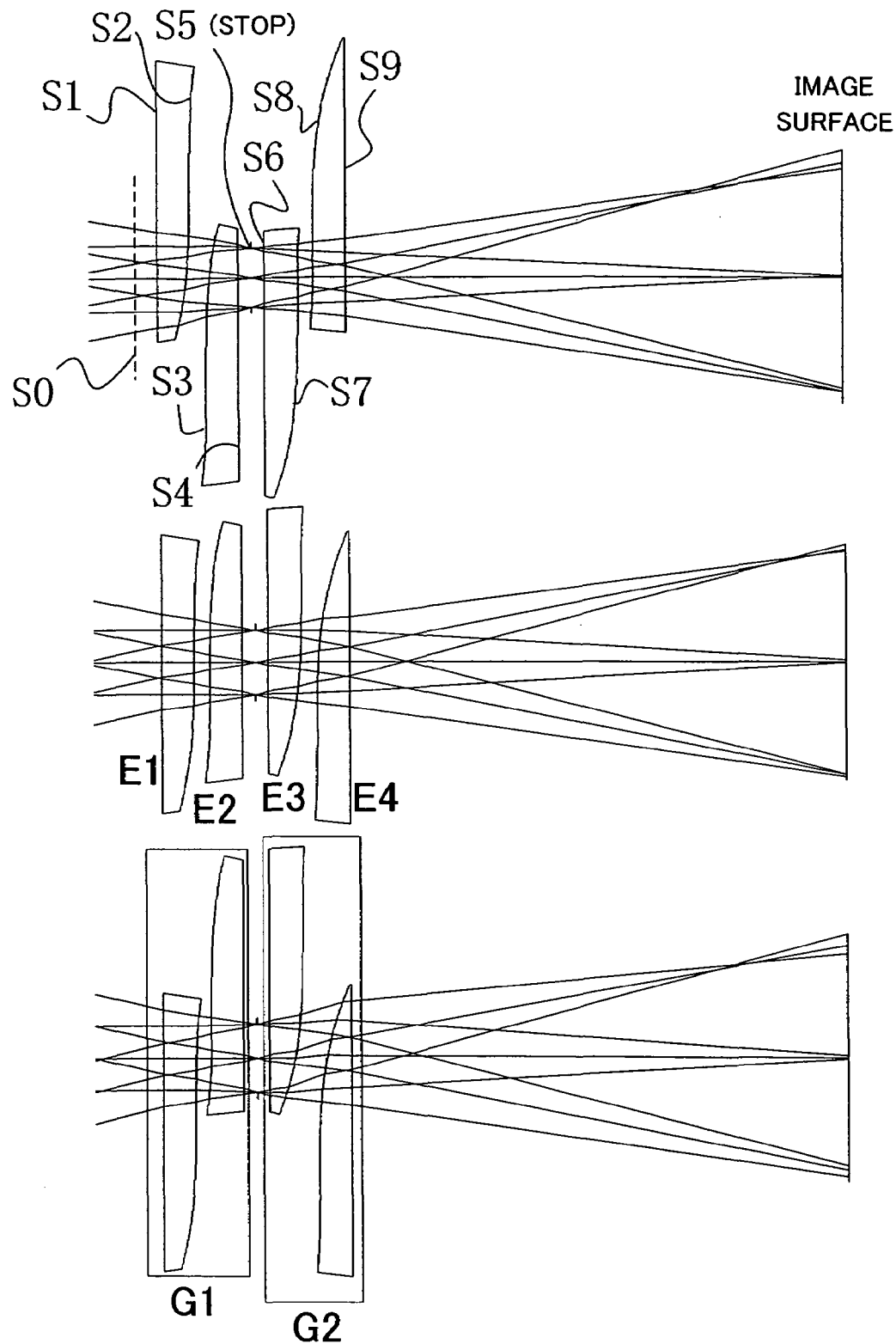
FIG. 4 is a sectional view of the lenses designed based on the prior art example.

It is likely that both the entire system and each unit have strong power at the wide-angle end. In general, the system having strong power is likely to produce aberration. The entire system inevitably has strong power at the wide-angle end, but the aberration reduces if the power of each unit is weakened. The power changes in FIG. 3 shows that the G1's power linearly changes to the power of the entire system, and the G2's power changes like a curve. These changes are apparent from Equations 8 and 9. However, there are various solutions depending upon the curved surface shape of the rotationally asymmetrical lens and the theory of the offset amount. If this solution weakens the power at the wide-angle side, the aberration reduces.

Figure 10:
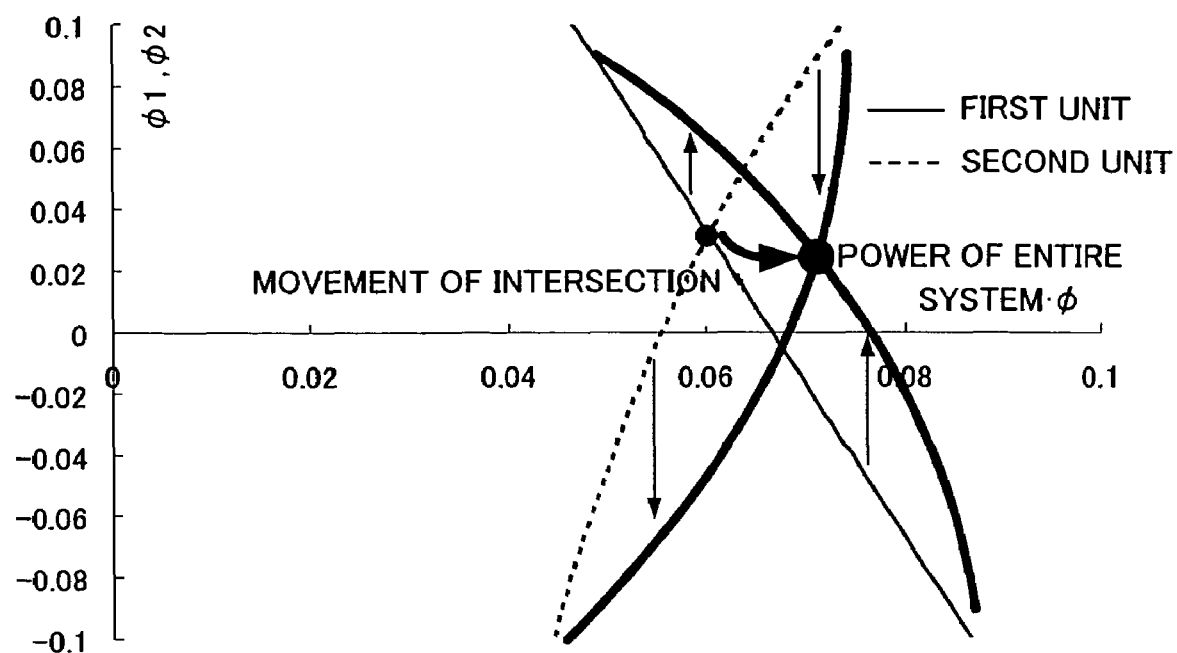
FIG. 10 shows that an intersection between the powers of G1 and G2 shifts to the wide-angle side.

For this purpose, as shown in FIG. 10, the G1's linear power change is turned to a curvature in the positive direction whereas the G2's power is turned in the negative direction. This structure makes the power strong at the telephoto end, and the power weak at the wide-angle end. In other words, an intersection at which both power changes accord with each other needs to shift to the wide-angle side. Equation 13 below is met, where $|\phi gw|max$ is a larger absolute power among the units at the wide-angle end, and $|\phi gt|min$ is a smaller absolute power among the units at the telephoto end:

$$|\phi gw|max < |\phi gt|min \quad \text{[EQUATION 13]}$$

Figure 1:
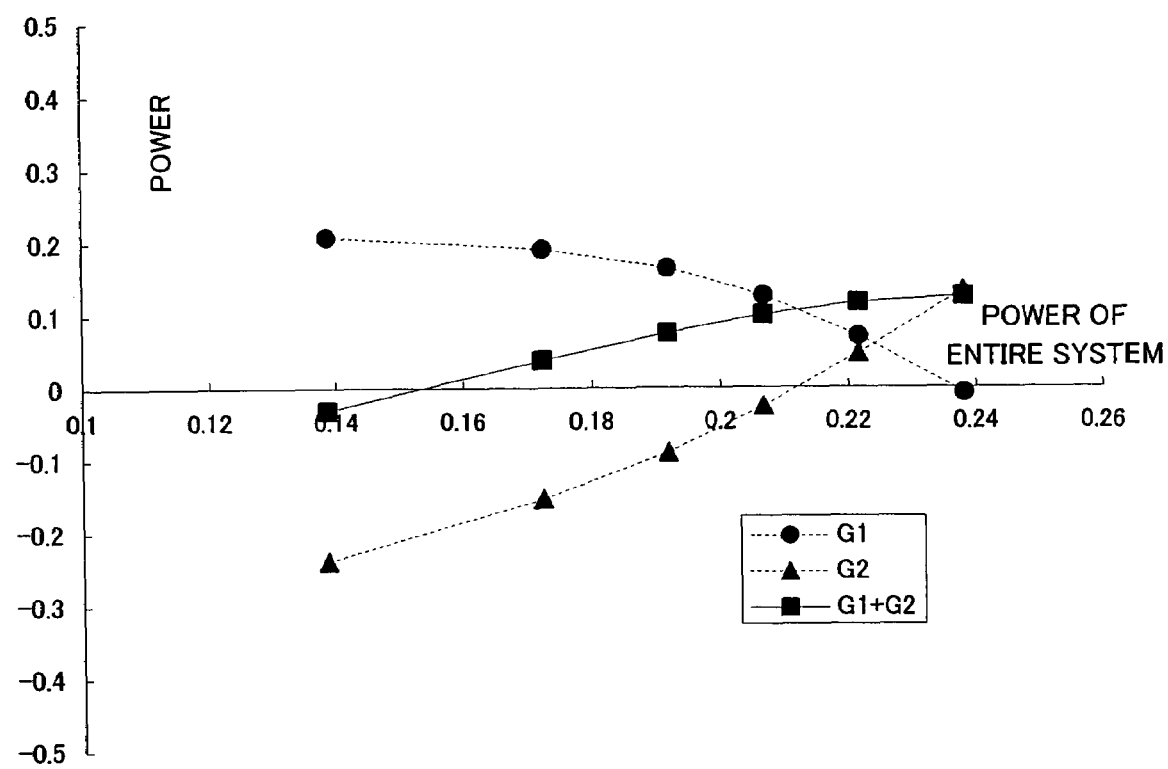
FIG. 1 is a view showing power changes of G1 and G2 according to one embodiment of the present invention.
Figure 2:
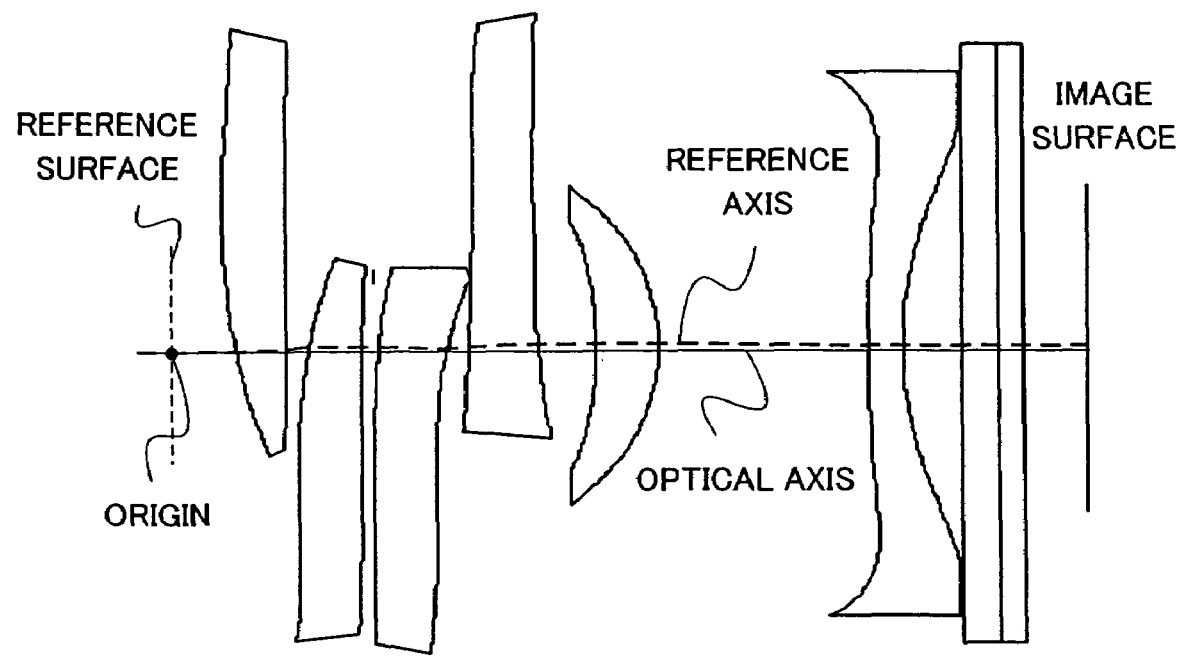
FIG. 2 is a view for explaining a conventional off-axial optical system.

FIG. 1 shows a relationship between the power of the entire system and the power change of each unit. Referring to FIG. 1, as the power of the entire system increases, the power of G1 in the decentering movable block changes from positive to negative and the power of G2 in the decentering movable block changes from negative to positive. The intersection shifts to the wide-angle side, and the absolute value of the power at the wide-angle side is smaller than that at the telephoto side. The absolute value of the power of each unit at the wide-angle side is made small for reduced aberration.

Figure 11:
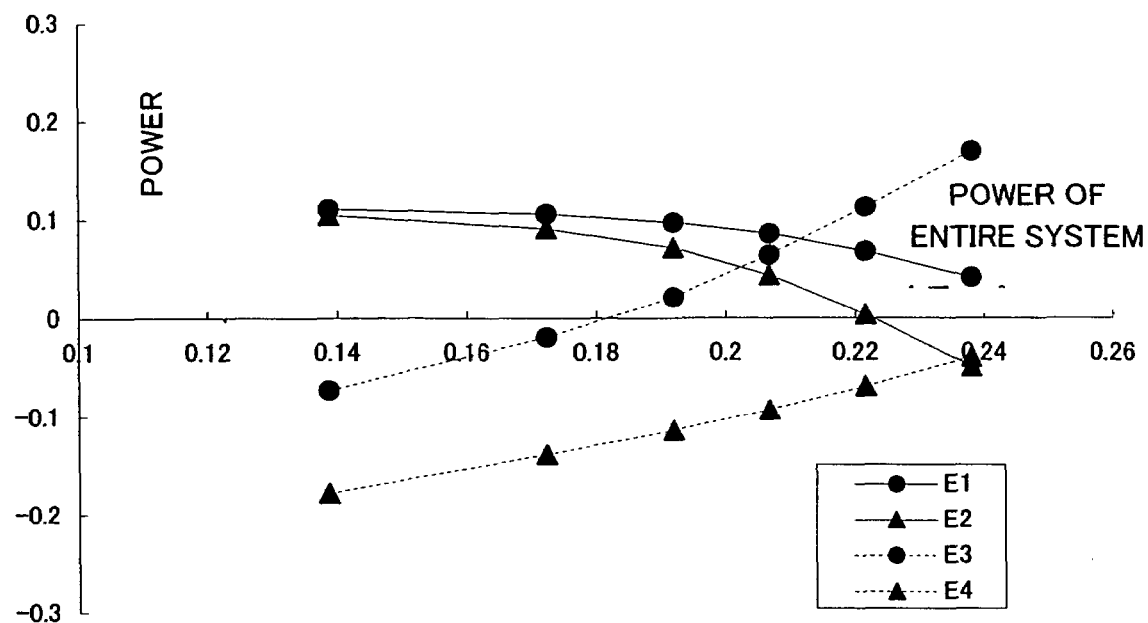
FIG. 11 shows power changes of E1, E2, E3 and E4 according to the embodiment shown in FIG. 1.

The aberration can be reduced by inverting the polarity (i.e., positive or negative) of the power of the lens in the unit. Therefore, the power arrangement in the unit at the wide-angle end that is likely to generate the aberration can invert the polarity. FIG. 11 shows the power change of each lens relative to the power of the entire system. Referring to FIG. 11, the power arrangement in the unit is positive, positive negative and negative at the telephoto end but positive, negative, positive and negative at the wide-angle end.

As the power of the entire system changes, the power of the decentering movable changes while the power of the auxiliary block maintains constant. The power of the entire power is calculated from the principal point separation and the power of these two blocks. For a desired value of the power of the entire system, various combinations of the power arrangement of the two blocks are conceivable. However, as the power of the decentering movable block is made strong, the aberration associated with decentering becomes large and control over the aberration becomes difficult. Therefore, it is necessary to compare both powers with each other, and to set the power of the decentering movable block smaller than or approximately equal to that of the power of the auxiliary block. Therefore, at the telephoto end at which the power is weak, the following condition should be met where $|\phi dt|$ is an absolute value of the power of the decentering movable block, and $|\phi st|$ is an absolute value of the power of the auxiliary movable block:

$$|\phi dt| \leq |\phi st| \quad \text{[EQUATION 14]}$$

Figure 12:
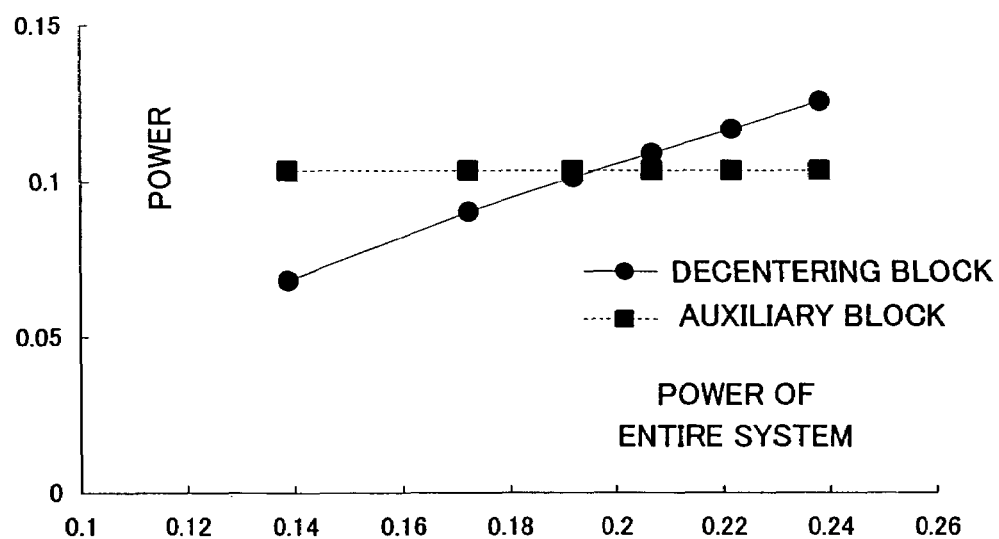
FIG. 12 shows power changes of a decentering movable block and an auxiliary block according to the embodiment shown in FIG. 1.

FIG. 12 shows a relationship between the power of the decentering movable block and the power of the auxiliary block of the first embodiment. It is understood that this condition satisfies Equation 14.

It is known that in general, as Petzval is large, the curvature of field increases, and as Petzval is small, the curvature of field decreases. Even in this embodiment, the curvature of field reduces by reducing Petzval. Petzval is given by the following equation, where $\phi_{Ei}$ is the power of the lens Ei and $n_{Ei}$ is a refractive index:

$$P_{Ei} = \phi_{Ei}/n_{Ei} \quad \text{[EQUATION 15]}$$

This value is always constant in a normal zoom lens system that uses a coaxial lens. However, this value is not always constant in such an optical system as in the present invention where the optical elements continuously decenter and the power changes. In addition, the glass material has a small changing range of refractive index between about 1.45 and about 1.9 for the power changes, the Petzval change may be regarded as the power change. Accordingly, in order to reduce Petzval, a range of the power change is determined so that the following equation is met where $|\phi max|$ is a maximum value of an absolute value of the power of G1 and G2, and $\phi_{12}$ is a sum of G1 and G2:

$$-|\phi max| \leq \phi_{12} \leq |\phi max| \quad \text{[EQUATION 16]}$$

It is understood from the power changes in FIG. 10 that a sum of G1 and G2 falls within that range.

Next, Petzval will be addressed. Table 7 shows Petzval of each of the decentering movable block, the auxiliary block and the entire system. Similarly, Table 8 shows a prior art example as a comparative example.

TABLE 7

|  | E1 | E2 | G1 | E3 | E4 | G2 | DECENTERING BLOCK |
|---|---|---|---|---|---|---|---|
| TELEPHOTO END | 0.503426 | 0.455159 | 0.958585 | −0.36544 | −0.72921 | −1.09464 | −0.136057518 |
| MIDDLE | 0.264618 | 0.123323 | 0.387941 | 0.177193 | −0.26423 | −0.08703 | 0.300908608 |
| WIDE-ANGLE END | 0.196862 | 0.007608 | 0.20447 | 0.293235 | −0.18407 | 0.109164 | 0.313634309 |

|  | E5 | E6 | AUXILIARY BLOCK | ENTIRE SURFACE |
|---|---|---|---|---|
| TELEPHOTO END | 0.922937 | −0.76976 | 0.153178087 | 0.017121 |
| MIDDLE | 0.619076 | −0.51633 | 0.102746923 | 0.403656 |
| WIDE-ANGLE END | 0.57769 | −0.48181 | 0.095878098 | 0.409512 |

TABLE 8

|  | FIRST UNIT | SECOND UNIT | ENTIRE SURFACE |
|---|---|---|---|
| TELEPHOTO END | 0.990678 | −0.37582 | 0.614858 |
| MIDDLE | 0.074878 | 0.598341 | 0.673219 |
| WIDE-ANGLE END | −0.37498 | 1.036717 | 0.661737 |

When a total of Petzval sum is compared between Tables 7 and 8, the first embodiment 1 has smaller Petzval. Since a sum of the Petzval in the auxiliary block is approximately equal to 0, the auxiliary block eliminates the curvature of field using a pair of positive and negative lenses. Apparently, this means that only the decentering movable block contributes to the Petzval sum of the entire system. Accordingly, it is understood that the Petzval of the decentering movable block exhibits such a low value as −0.13 at the telephoto end and 0.3 at the midpoint and wide-angle end, which value is about half the prior art value, enabling an elimination of the curvature of field. Indeed, when the aberrational diagram is addressed, the curvature of field occurs at the midpoint and the wide-angle end whereas only the image plane inclines at the telephoto end rather than the curvature of field. This means that a total of Petzval sum corresponds to the aberration.

Figure 13:
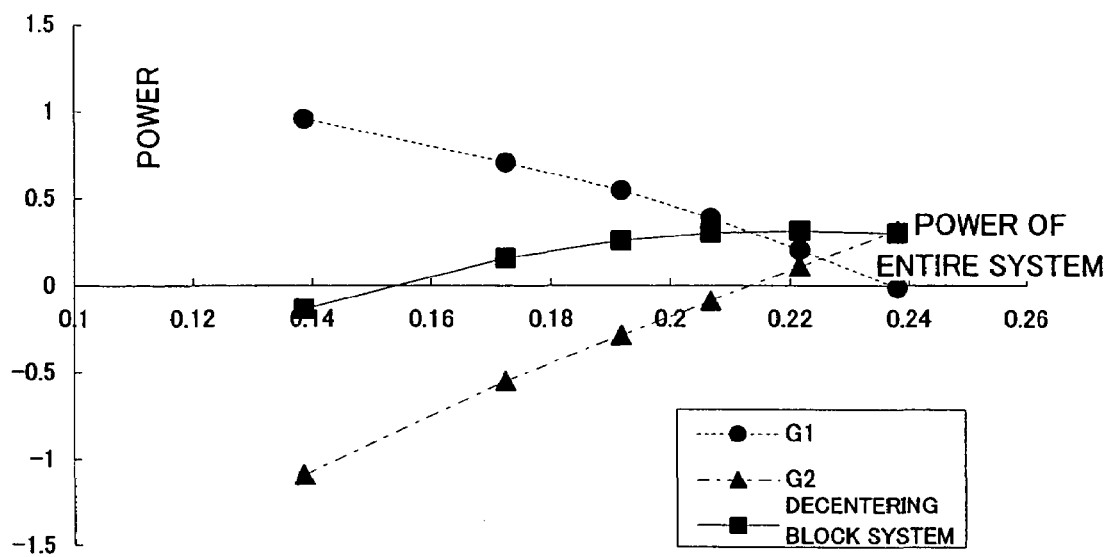
FIG. 13 shows changes of Petzval according to the embodiment shown in FIG. 1.
Figure 14:
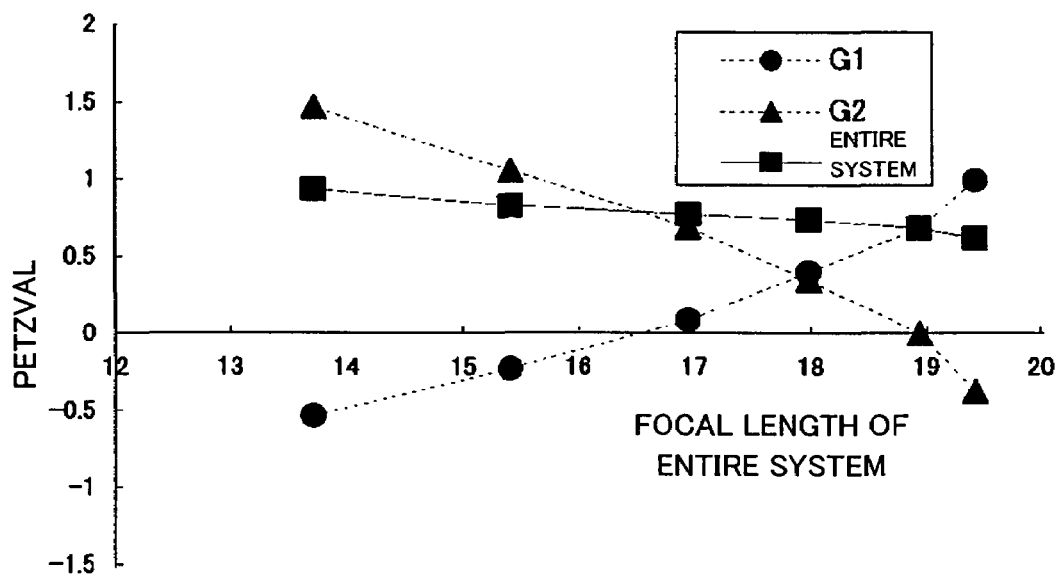
FIG. 14 shows changes of Petzval of a lens designed based on the prior art example.

FIG. 13 shows changes of the Petzval sum to the powers of G1, G2 and the entire system including G1 and G2. FIG. 14 shows a prior art example as a comparative example. When FIG. 13 is compared with FIG. 14, each of G1 and G2 has approximately the same absolute value of the Petzval sum between the prior art example and the first embodiment, but the first embodiment has a smaller changing amount. In addition, in the first embodiment, G1's positive Petzval of G1 cancels out G2's negative Petzval, and the sum of them changes around 0. On the other hand, in the prior art example, the Petzval sum of G1 and G2 is always positive without cancellation. These two results relates to the above range of $\phi_{12}$. Thus, the first embodiment removes the curvature of field.

Ideally, the powers of G1 and G2 have the same absolute value but different polarities. Since the glass material's refractive index falls within a limited range, Petzval can be made close to 0 and the curvature of field is eliminated. The Petzval sum theoretically decreases when G1 and G2 have powers having similar absolute values and different polarities. However, such powers of G1 and G2 reduce the power of the entire system and pose a problem that a wide-angle arrangement scheme becomes difficult. A method for reducing the Petzval sum and for maintaining the power of the entire system can be found in the following equation:

$$\phi_{total} = \phi_1 + \phi_2 - e\phi_1\phi_2 \quad \text{[EQUATION 17]}$$

Equation 17 expresses the power $\phi_{total}$ of the decentering movable block using the power $\phi_1$ of G1, the power $\phi_2$ of G2, and the principal point separation "e." It is understood that a larger value for e is preferable when $\phi_1$ and $\phi_2$ have different polarities but similar absolute values and the glass material does not change. A principal point separation is compared between the first embodiment and the prior art example. Since their entire systems have different powers, a ratio of the principal point separation to the entire system's power is compared between them. Tables 9 and 10 show these ratios.

TABLE 9

| FOCAL LENGTH | TELEPHOTO END | MIDDLE | WIDE-ANGLE END |
|---|---|---|---|
| PRINCIPAL POINT SEPARATION | 0.027587 | 0.379922 | −0.04262 |

TABLE 10

| FOCAL LENGTH | TELEPHOTO END | MIDDLE | WIDE-ANGLE END |
|---|---|---|---|
| PRINCIPAL POINT SEPARATION | 0.020994 | 0.036047 | 0.041308 |

As a result of comparison, the principal point separations at the telephoto end and the wide-angle end are approximately equal between them, whereas the principals point separation at the midpoint of the first embodiment is greater than that of the prior art example. Therefore, the first embodiment increases the entire system's power by increasing the principal point separation while maintaining the absolute values of the powers of G1 and G2.

Figure 15:
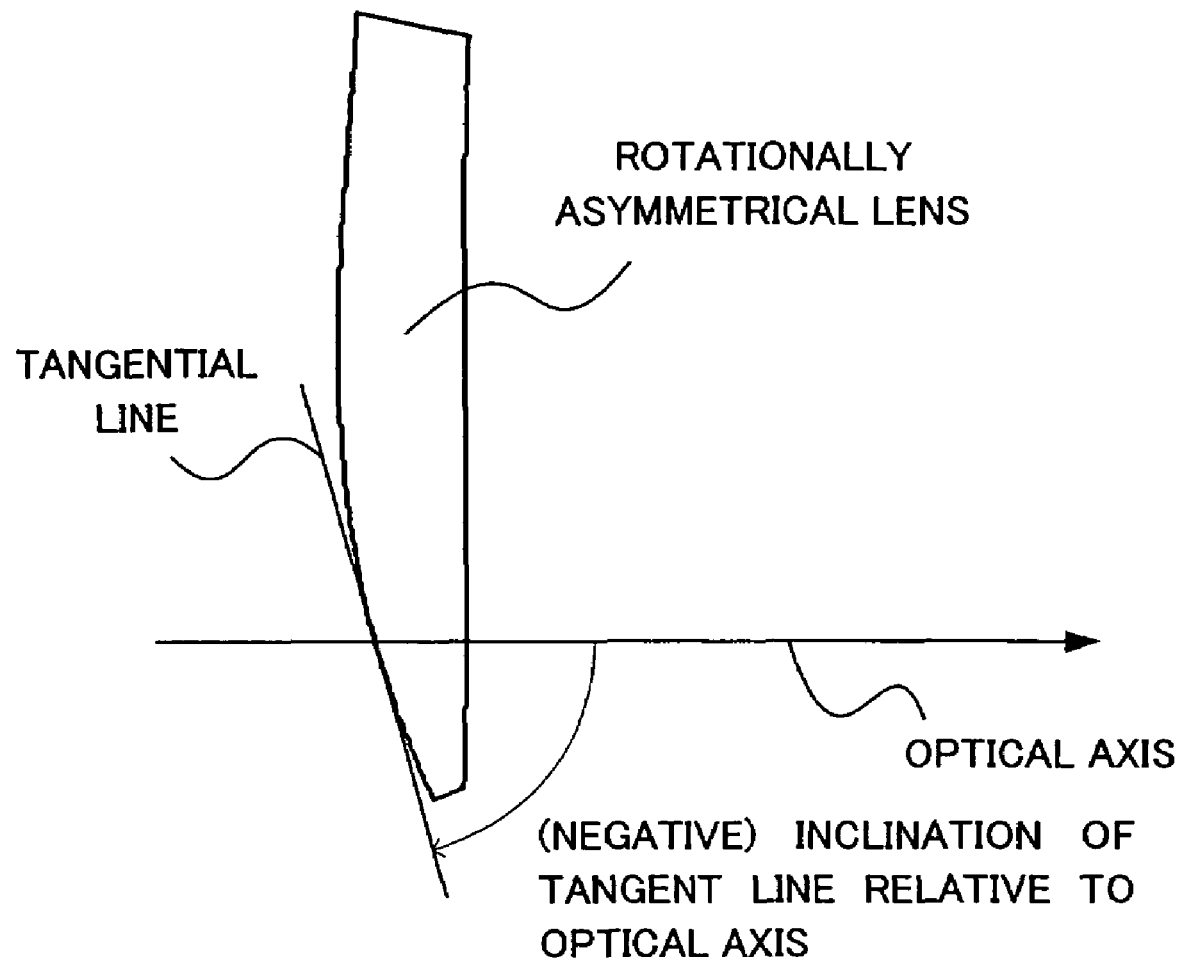
FIG. 15 is a view that defines a tangential line of a surface.

In order to reduce an offset between the upper and lower rays of the on-axial light in the first embodiment, which is referred to as on-axis coma hereinafter, this embodiment reduces an angle between the ray and the optical axis. As shown in FIG. 15, an inclination of the tangential line is addressed at an intersection where each surface intersects with the optical axis. When the tangential line on a certain surface has a positive inclination relative to the optical axis, an arrangement of a surface similarly having a negative inclination is effective to reduce the angle between the ray and the optical axis and the on-axis coma. As a result, each surface has an optical-path diagram as shown in FIG. 5. For example, the tangential line has a negative inclination relative to the Y-axis at the telephoto end S1, whereas S3 has a positive inclination, reducing the on-axis coma through the inverse correction. The on-axis coma can be reduced by minimizing the total. This range is set as follows, where "i" is a surface number of a surface Si and Ki is an inclination of a surface Si:

$$\left| \sum_i K_i \right| < K_{max} \quad \text{[EQUATION 18]}$$

From Optics Vol. 29, No. 3 (2000), the power $\phi$ of the surface is given as follows, where C is a local curvature of a curved surface, N and N' are refractive indexes at light incident and exit sides, respectively, and $\theta$ and $\theta'$ are incident and exit ray angle relative to the surface normal:

$$\phi = 2(N' \cos \theta' - N \cos \theta)C \quad \text{[EQUATION 19]}$$

It is understood from this equation that the power changes due to the refractive indexes at the front and back of the curved surface and the incident and exit ray angle. In addition, the following relationship is established from the Snell's law:

$$N \sin \theta = N' \sin \theta' \quad \text{[EQUATION 20]}$$

The following equation is introduced by substituting Equation 20 for Equation 19 and deleting $\theta'$:

$$\frac{\varphi}{C_{02}} = 2N'\sqrt{1 - \frac{N^2 \sin^2 \theta}{N'^2}} - 2N\cos\theta \quad \text{[EQUATION 21]}$$

Figure 16:
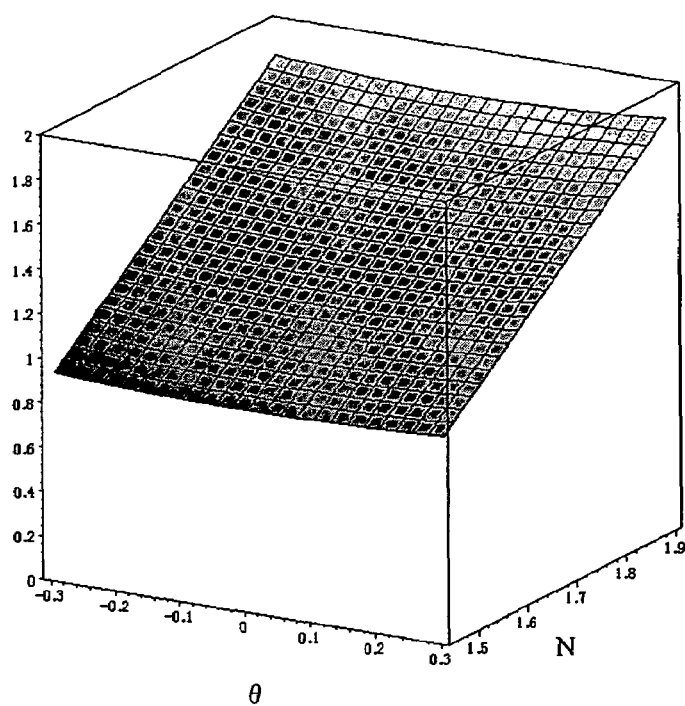
FIG. 16 is a view for explaining Equation 21.

FIG. 16 shows a graph showing a relationship between N' and $\theta$ where N=1. $\theta$ ranges between −0.3 [rad] and 0.3 [rad] (or a range of about ±17°). It is understood that the changing amount of $$2N'\sqrt{1 - \frac{N^2 \sin^2 \theta}{N'^2}} - 2N\cos\theta$$

in this range is more sensitive to the refractive index N' than the incident angle $\theta$. $\phi$ changes when the front and back of the surface changes from air to glass or glass to air, and the refractive index of the glass material. $\phi$ becomes large when the front and back of the surface changes from glass to air, and the glass is has a large refractive index. From the above, even when a radius of curvature is the same, the power of the surface greatly differs according to the refractive index.

In order for one surface to greatly change the power, a large inclination of the curved surface and a large change of the curvature are required. Therefore, as the power's changing amount increases, the maximum value of the inclination tends to increase. From the above discussion, the power fluctuates depending upon the refractive index, and thus its range is defined as follows, where Kmax is the maximum value of an inclination on each surface, and $\Delta\phi$ is a changing amount of the power on each surface:

$$0 \leq K_{max}/\Delta\phi \leq 3 \quad \text{[EQUATION 22]}$$

Figure 17:
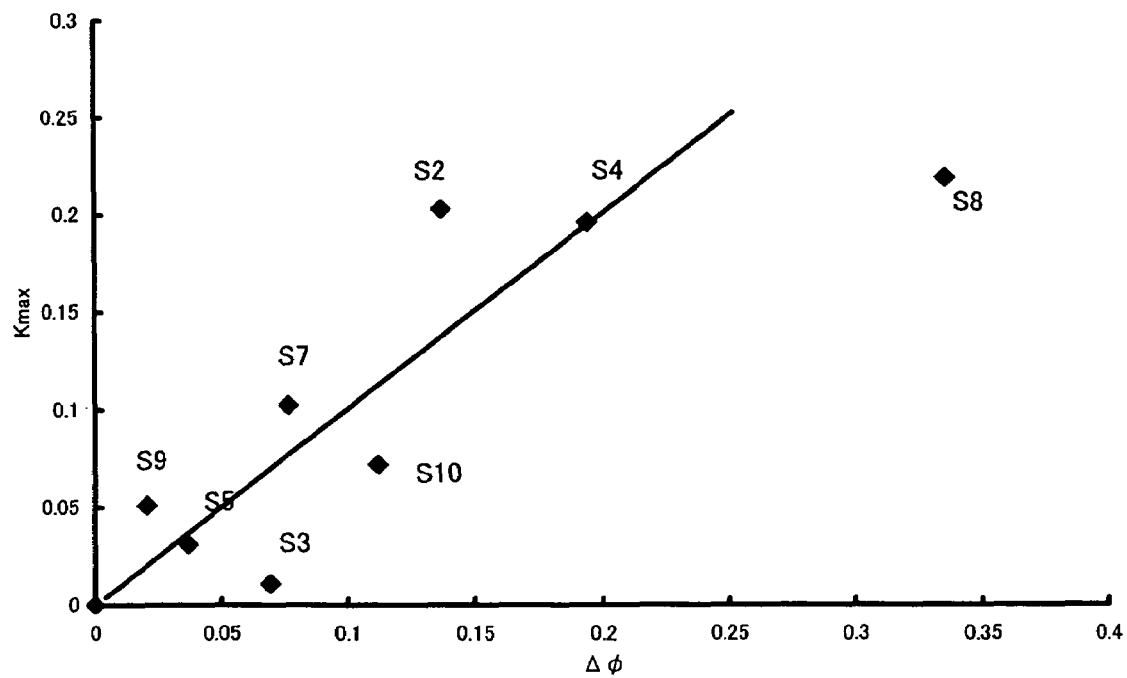
FIG. 17 shows a relationship between $\Delta\phi$ and Kmax.
Figure 18:
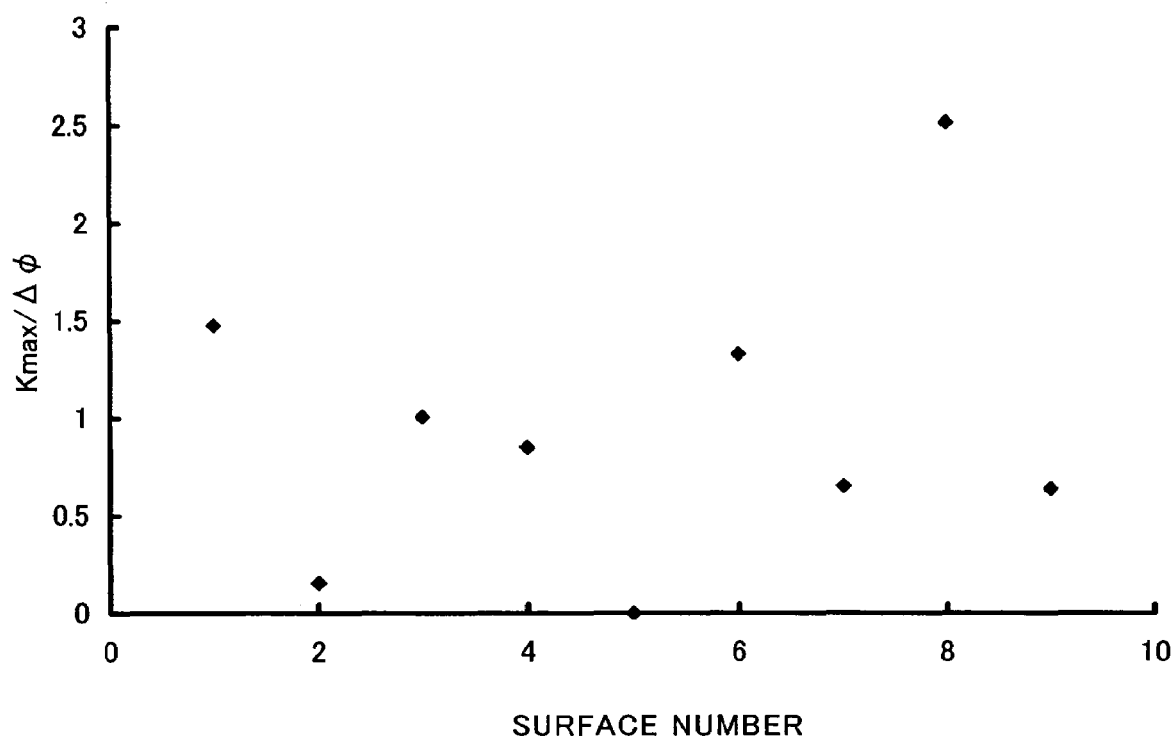
FIG. 18 shows a relationship between a surface number and Kmax/$\Delta\phi$.

FIG. 17 shows a relationship between Kmax and $\Delta\phi$ for each surface of the first embodiment. The straight light shown in FIG. 17 is a line of Kmax=$\Delta\phi$ where both $\theta$ and $\theta'$ are zero, and both refractive indexes are 1. The materials change from air to a glass material at the boundary of the surfaces above the line, and the materials change from the glass material to air at the boundary of the surfaces below the line. It is understood that as the refractive index of the glass material increases φ increases, approaching to the line. FIG. 18 illustrates a value of an inclination Kmax/Δφ for each surface, which inclination ranges between 0.16 and 2.5 and satisfies the claimed range.

Table 11 shows an inclination of a tangential line for each surface:

TABLE 11

|  | TELEPHOTO END | MIDDLE | WIDE-ANGLE END |
|---|---|---|---|
| S1 | −0.20264 | −0.01256 | 0.060318 |
| S2 | −2.97E−03 | 8.31E−04 | −1.08E−02 |
| S3 | 0.195687 | 0.008496 | −0.00876 |
| S4 | −3.12E−02 | 7.73E−04 | −2.10E−02 |
| S5 | −2.1E−31 | 4.9E−32 | 1.22E−30 |
| S6 | 0.102096 | 0.005675 | −0.00234 |
| S7 | −0.21847 | −0.00966 | −0.01947 |
| S8 | 0.050997 | 0.00269 | 0.017836 |
| S9 | 7.16E−02 | 2.23E−03 | −3.88E−03 |
| TOTAL | −0.03493 | −0.00152 | 0.011921 |

Figure 19:
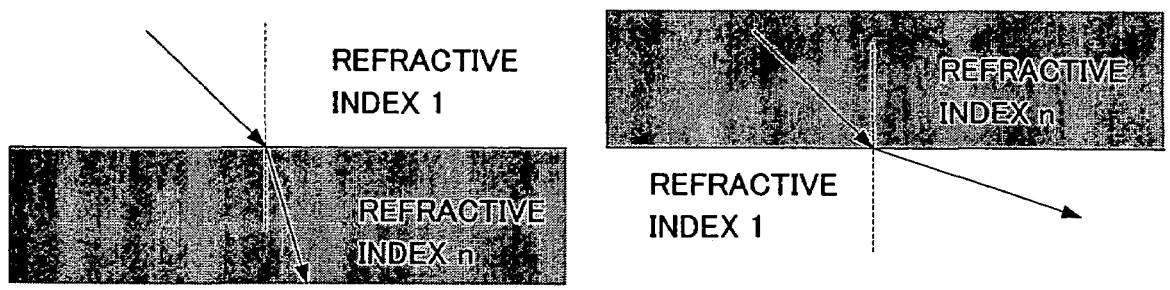
FIG. 19 shows different diffracting directions.

Even when the surface has the same inclination, the light traveling direction differs according to the refractive index n, as shown in FIG. 19. In determination, an inclination of a surface that exits the light from a low refractive index side to a high refractive index side is multiplied by −1. It is understood from the totals that Equation 18 is established in each surface.

Figure 20:
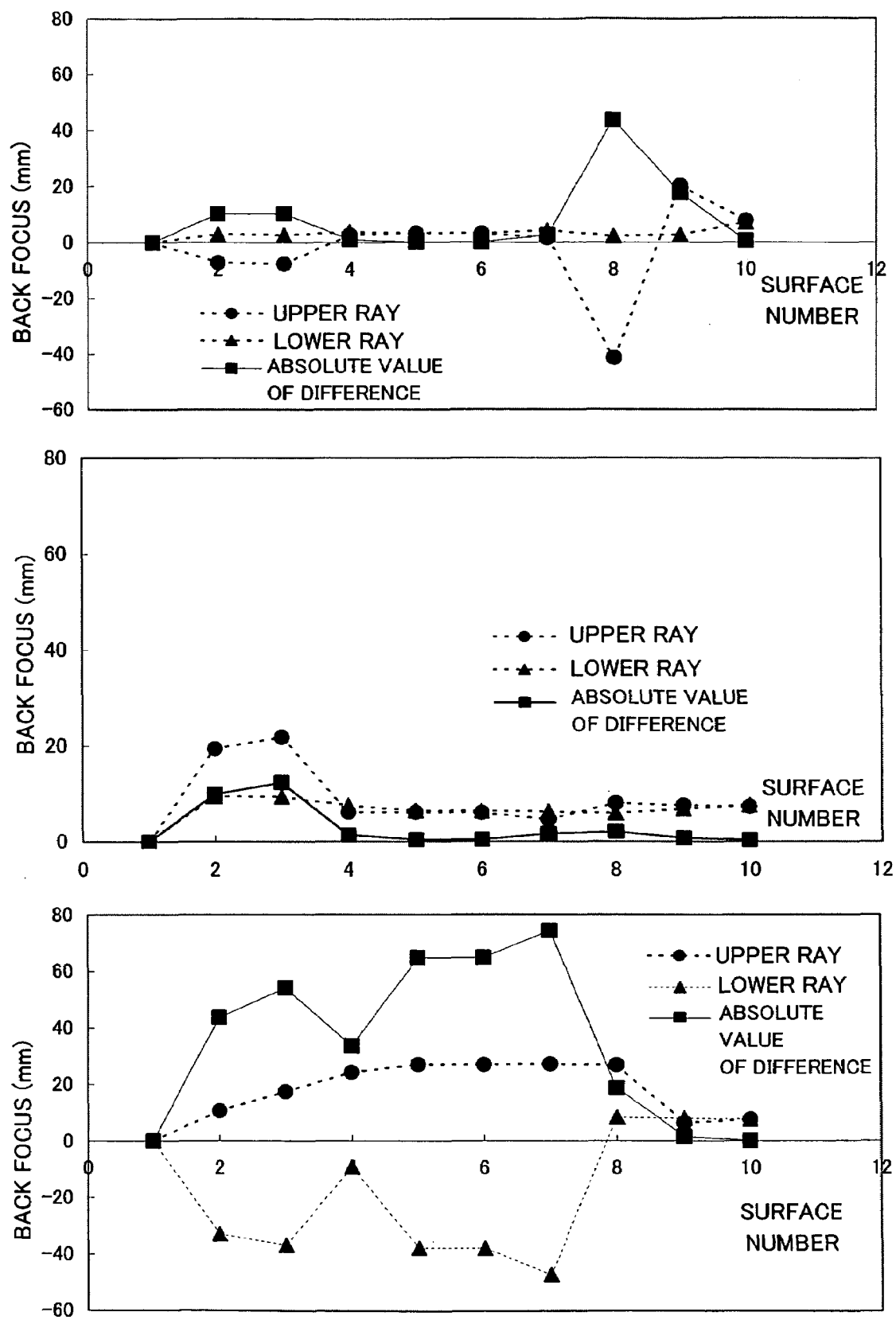
FIG. 20 shows offsets between upper and lower rays according to the embodiment shown in FIG. 1.
Figure 21:
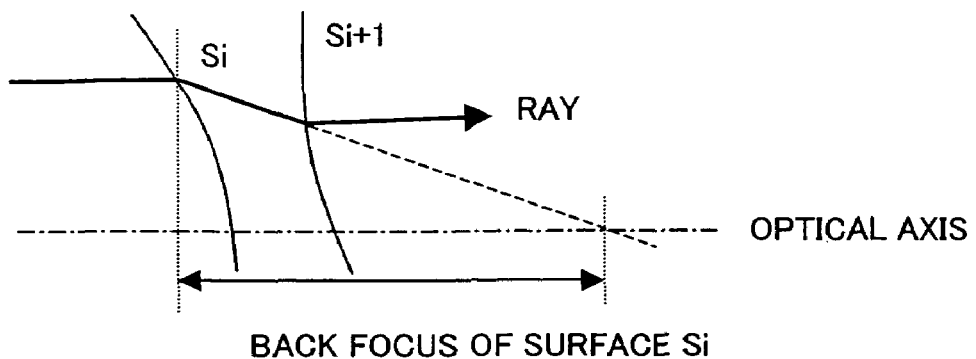
FIG. 21 is a view for explaining a back-focus on a Si surface.

FIG. 20 shows the on-axis coma amount of each surface so as to confirm that the inclination of the tangential line eliminates the on-axis coma at an intersection between each surface and the optical axis. The abscissa axis denotes a surface number, and the ordinate axis denotes a distance between the surface Si and a point at which upper and lower rays of the light exited from Si reach the optical axis as shown in FIG. 20, i.e., the back-focus of the light. A direction from the object plane to the image plane is defined as positive. Since S6 is a stop surface, it is understood that the upper and lower rays of S5 and S6 have the same back-focus value throughout FIG. 20. The absolute value of a difference shown in FIG. 20 is an absolute value of a difference of the back-focus between the upper and lower rays. When the absolute value of the difference is 0, then the upper and lower rays image on the same point with no on-axis coma. It is understood from FIG. 20 that the tenth surface as a final surface of the rotationally asymmetrical lens has approximately the same back-focus between the upper and lower rays. Therefore, there is no on-axis coma, and the light is equivalent to the coaxial system after the rotationally asymmetrical lens. No off-axial aberration remains. Therefore, it is unnecessary to provide a rotationally asymmetrical surface to the auxiliary lens that is located closer to the image plane than the decentering movable block.

A principal point position should be greatly moved from the lens position for zooming with a smaller configuration. In the prior art lens that provides a cubic curve only to one surface, the principal point is located on the surface having the cubic coefficient and does not greatly change. One method for greatly changing the principal point position is, for example, use of a meniscus, rotationally asymmetrical lens having a curvature only on one surface. Different from convex and concave lens, the meniscus lens is a lens that can arrange the principal point outside the lens. When this shape is applied to a rotationally asymmetrical lens, the principal point can be changed greatly outside the lens. However, when the meniscus, rotationally asymmetrical lens causes an offset between the upper and lower rays of the on-axial light at the telephoto end or wide-angle end (when the light passes the edge of the lens). Therefore, another lens should be used to correct the offset. One method as a solution for this problem is to use a meniscus lens having an inverse inclination and to cancel the offset between the upper and lower rays. When a cubic or higher order coefficient is introduced into a surface, the coefficient is determined by taking the above into account. In addition, it is preferable to form a meniscus shape so that a distance between lenses reduces, because when closely arranged lenses can minimize and remove the on-axis coma on each surface.

Thus, the on-axis coma is removed.

Figure 22:
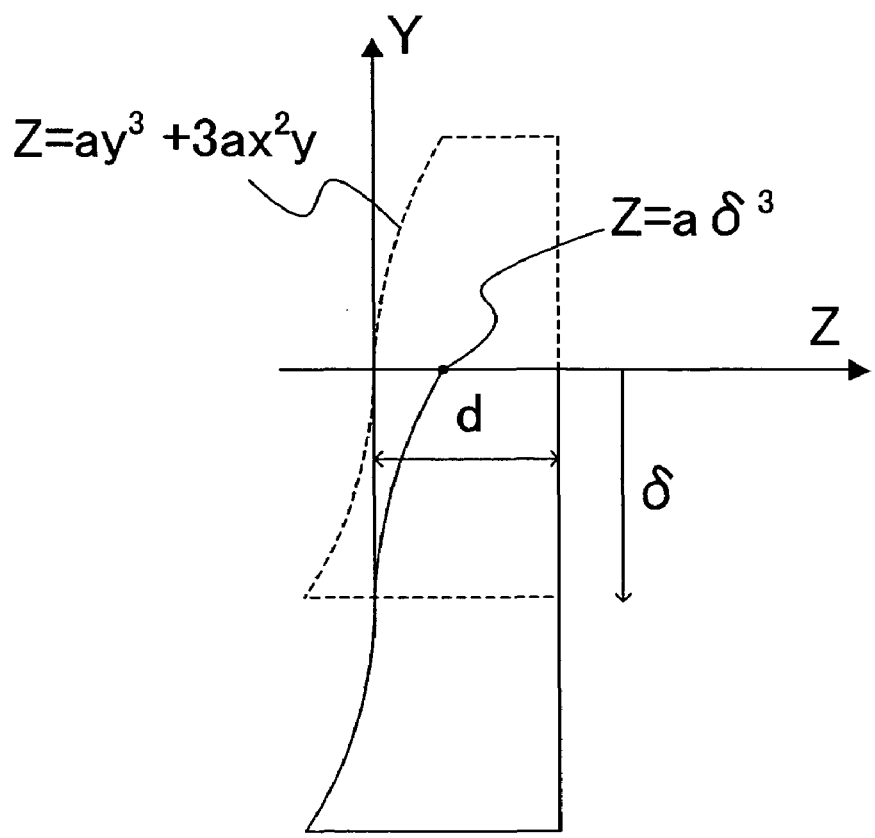
FIG. 22 shows a relationship among a lens shape, a lens's thickness, and an offset amount.

The power of the lens is calculated from Equation 11 where δmax is the maximum amount when the rotationally asymmetrical lens whose surface shape is given by Equation 10 is decentered in the Y-axis direction by δ. The following equation is met where "d" is a thickness of the lens from a condition that the thickness of the lens edge thickness is 0 or greater as shown in FIG. 22:

$$a\delta_{max}^3 \Box d \qquad [\text{EQUATION 23}]$$

Equation 24 is obtained from Equations 23 and 11:

$$\varphi_{max} = 12a(n-1)\delta_{max} \leq 12(n-1)\frac{d}{\delta_{max}^2} \qquad [\text{EQUATION 24}]$$

Equation 25 is obtained by modifying Equations 24:

$$\varphi_{max}\delta_{max} \leq 12(n-1)\frac{d}{\delta_{max}} \qquad [\text{EQUATION 25}]$$

Since 12(n−1) is constant, a product between the power φmax and the offset amount δmax is determined by d/δmax or the lens's thickness relative to the offset amount. As "d" increases, the power becomes stronger and the aberration increases. As δmax increases, the lens becomes larger. From the standpoint of the aberration correction and compact configuration, d/δmax is preferably 1 or smaller. Since the first embodiment sets "d" to 0.5 mm, and the offset amount δmax to about 1.34 mm, d/δ=0.37<1. In summary, the following equation is considered reasonable.

$$\delta \times \varphi < 6 \qquad [\text{EQUATION 26}]$$

The maximum product between δ and φ in the first embodiment is calculated as 0.32 for δ=−1.34358 and φ=0.238784 for G2 at the wide-angle end, satisfying the above range.

Second Embodiment

Figure 23:
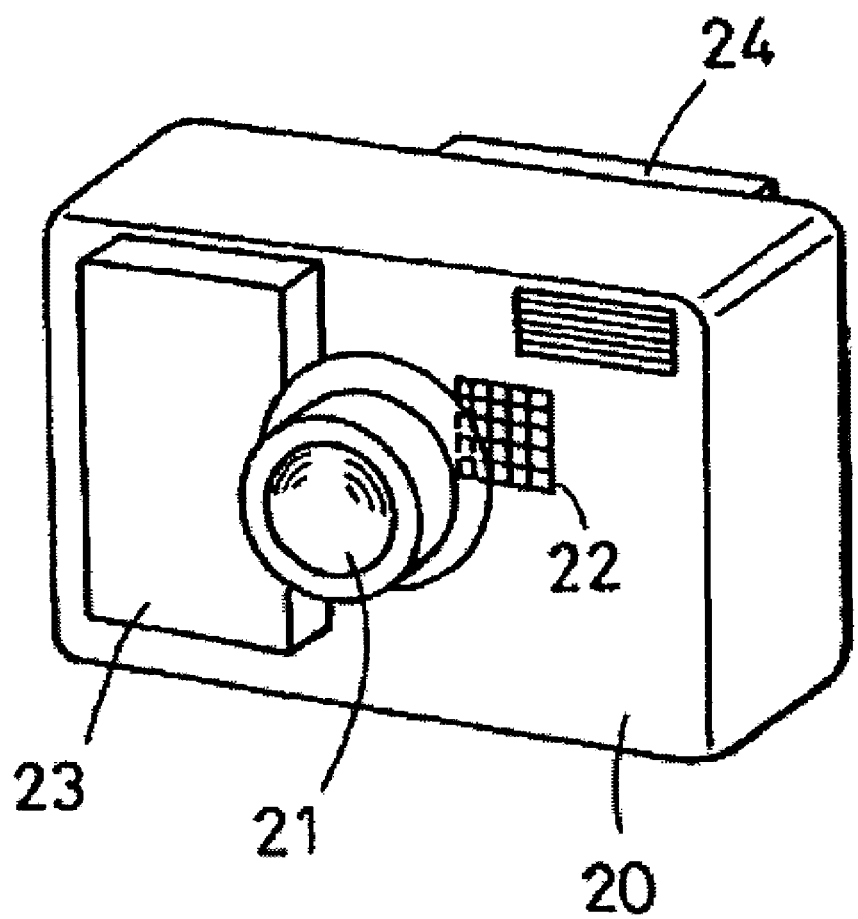
FIG. 23 is a perspective overview of a digital still camera to which the optical system shown in FIG. 1 is applied.

A description will now be given of a digital still camera that uses a zoom lens (or zoom lens system) shown in FIG. 1 for an image-taking optical system, with reference to FIG. 23. In FIG. 23, 20 denotes a camera body. 21 denotes an image-taking optical system that includes a zoom lens described with reference to FIG. 1. 22 dentoes a CCD sensor, a CMOS sensor or another photoelectric conversion element. 23 denotes a memory that records information corresponding to a subject image that is photoelectrically converted by the sensor 22. 24 denotes a finder, such as a LCD panel, for observing the subject image formed on the sensor 22.

Thus, an application of the inventive zoom lens to an image-taking apparatus, such as a digital still camera, would realize a small image-taking apparatus having high optical performance.

As described above, the above embodiments can provide a compact zoom lens system that moves a rotationally asymmetrical lens in a direction different from the optical axis and sufficiently eliminates the aberration, and an image-taking apparatus having the same.

Further, the present invention is not limited to these preferred embodiments, and various variations and modifications may be made without departing the scope of the present invention.

This application claims a benefit of foreign priority based on Japanese Patent Application No. 2004-224770, filed on Jul. 30, 2004, which is hereby incorporated by reference herein in its entirety as if fully set forth herein.

What is claimed is:

1. A zoom lens system comprising plural optical units each of which includes plural optical elements each having a rotationally asymmetrical surface, said zoom lens system changing optical power as the optical elements in each of the plural optical units move in directions different from an optical axis,
    wherein the plural optical units have first and second units, and when the optical power of the first unit changes from positive to negative, the second unit changes from negative to positive,
    wherein a variation range of the optical power of an entire system includes a point where the first and second units have the same optical power, and
    wherein the point shifts to a side where optical power is greater than a center of the variation range of the optical power of the entire system.

2. A zoom lens system according to claim 1, wherein $|\phi gw|max < |\phi gt|min$ is met, where $|\phi gw|max$ is an absolute value of larger optical power at a position where the entire system has the maximum optical power, and $|\phi gt|min$ is an absolute value of larger optical power at a position where the entire system has the minimum optical power among the optical powers of the first and second units.

3. A zoom lens system according to claim 1, wherein $-|\phi|max \leq \phi_{12} \leq |\phi|max$ is met, where $|\phi|max$ is a maximum value among absolute values of the optical powers of the first and second units, $\phi_{12}$ is a sum of the optical powers of the first and second units and $\phi_{12}=\phi_1+\phi_2$.

4. A zoom lens system according to claim 1, wherein a Si surface is defined as an i-th surface in order from a front and $$\left|\sum_i K_i\right| < K_{max}$$

is met, where Ki is an inclination of a tangential line at an intersection between the Si surface and the optical axis, Kmax is a maximum value of Ki, and $$\left|\sum_i K_i\right|$$

is an absolute value of a sum of Ki throughout the optical system.

5. A zoom lens system according to claim 4, wherein $0 \leq Kmax/\Delta\phi \leq 3$ is met, where $\Delta\phi$ is a varying amount of the optical power of each surface.

6. A zoom lens system according to claim 1, further comprising an optical element that has a symmetry at least in one direction, and does not move in the direction different from the optical axis.

7. A zoom lens system according to claim 1, wherein $|\phi dt| \leq |\phi st|$ is met, where $|\phi dt|$ is an absolute value of the optical power of a decentering movable block at a telephoto end, and $|\phi st|$ is the optical power of an auxiliary block,
    wherein the decentering movable block is defined as a set of the optical units that continuously move in the direction different from the optical axis and change the optical power, and the auxiliary block is defined as a set of the optical units that do not move.

8. A zoom lens system according to claim 7, wherein as the auxiliary block separates from a stop, the auxiliary block has a positive and negative power arrangement.

9. A zoom lens system according to claim 7, wherein $\delta \times \phi < 6$ is met, where $\delta$ is a varying amount from the optical axis of the optical element in the zoom lens system, and $\phi$ is the optical power of the optical unit that decenters by $\delta$.

10. A zoom lens system according to claim 1, wherein the plural optical elements in each optical unit at a position where the entire optical system has the maximum optical power have optical powers with inverse signs.

11. A zoom lens system according to claim 10, wherein the plural optical elements in the first and second units have positive, negative, positive and negative optical powers in order from a front at a position where the entire optical system has the maximum optical power.

12. A zoom lens system according to claim 10, wherein the plural optical elements in the first and second units have positive, positive, negative and negative optical powers in order from the front at a position where the entire optical system has the maximum optical power.

13. A zoom lens system according to claim 1, wherein said zoom lens system forms an image on a photoelectric conversion element.

14. An image-taking apparatus comprising:
    a zoom lens system according to claim 1; and
    a photoelectric conversion element for receiving an image formed by the zoom lens system.

* * * * *